Figure 1:
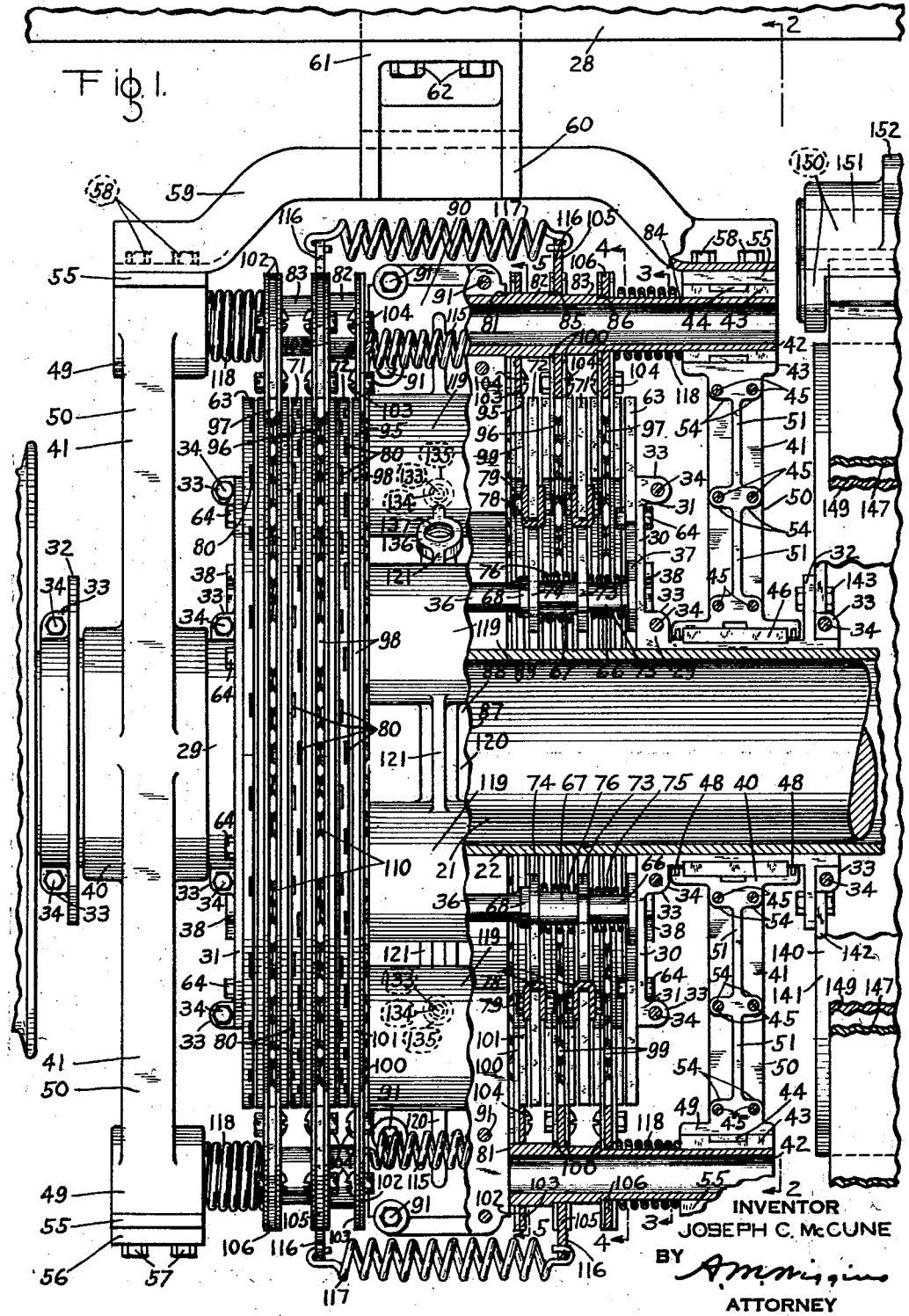
Figure 2:
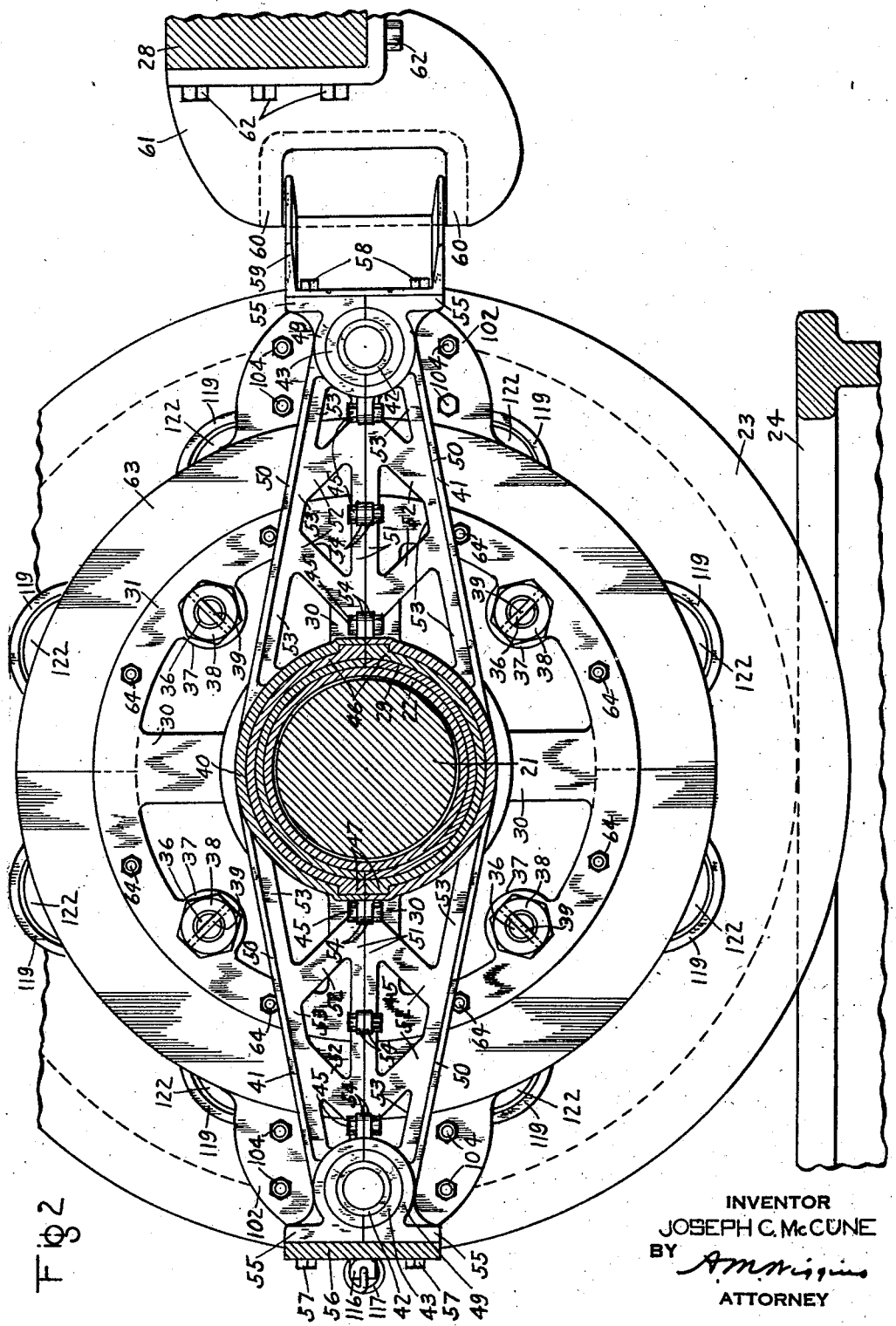

Oct. 22, 1940.    J. C. McCUNE    2,218,614
VEHICLE BRAKE
Filed Aug. 19, 1938    8 Sheets-Sheet 1

INVENTOR
JOSEPH C. McCUNE
BY
ATTORNEY

Oct. 22, 1940.  J. C. McCUNE  2,218,614
VEHICLE BRAKE
Filed Aug. 19, 1938  8 Sheets-Sheet 4

INVENTOR
JOSEPH C. McCUNE
BY
ATTORNEY

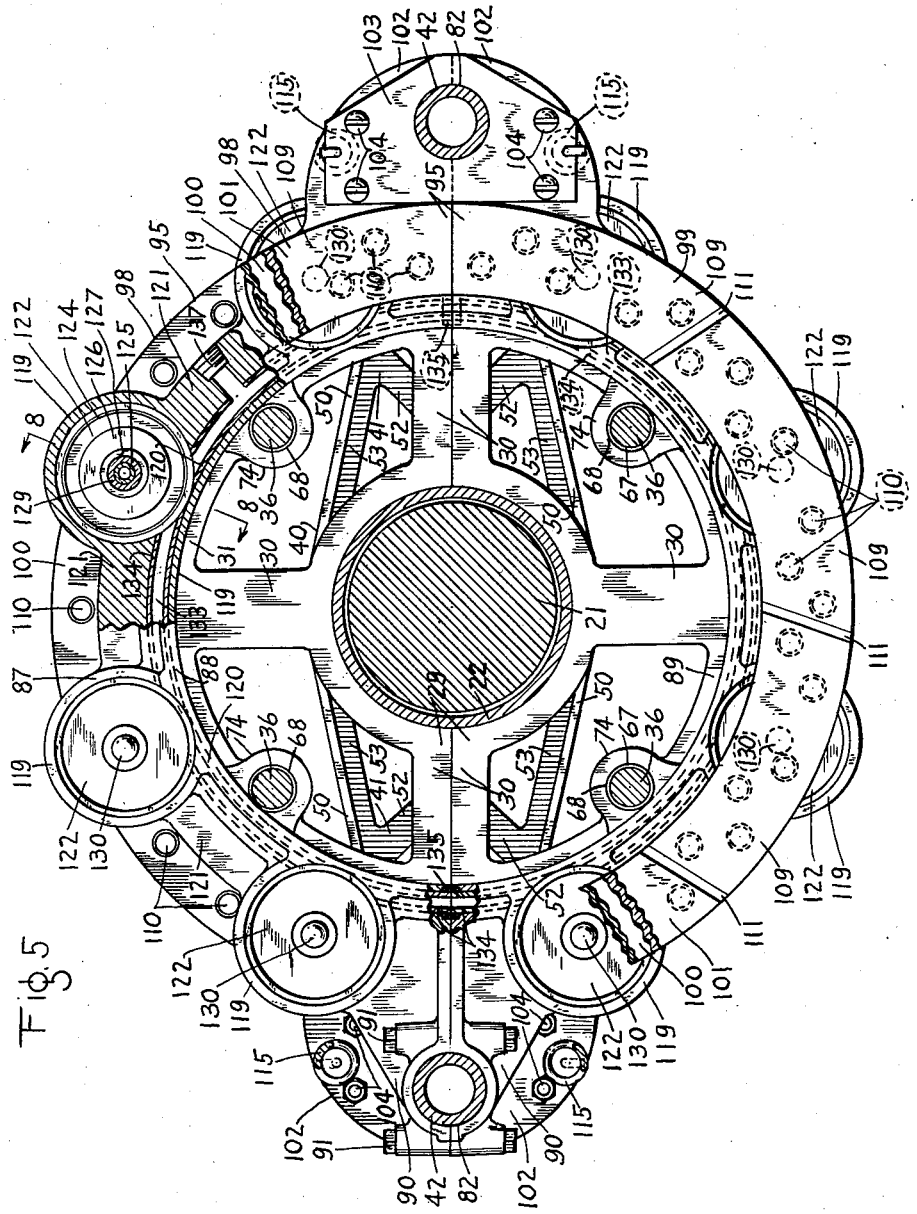

Oct. 22, 1940.  J. C. McCUNE  2,218,614
VEHICLE BRAKE
Filed Aug. 19, 1938  8 Sheets-Sheet 6
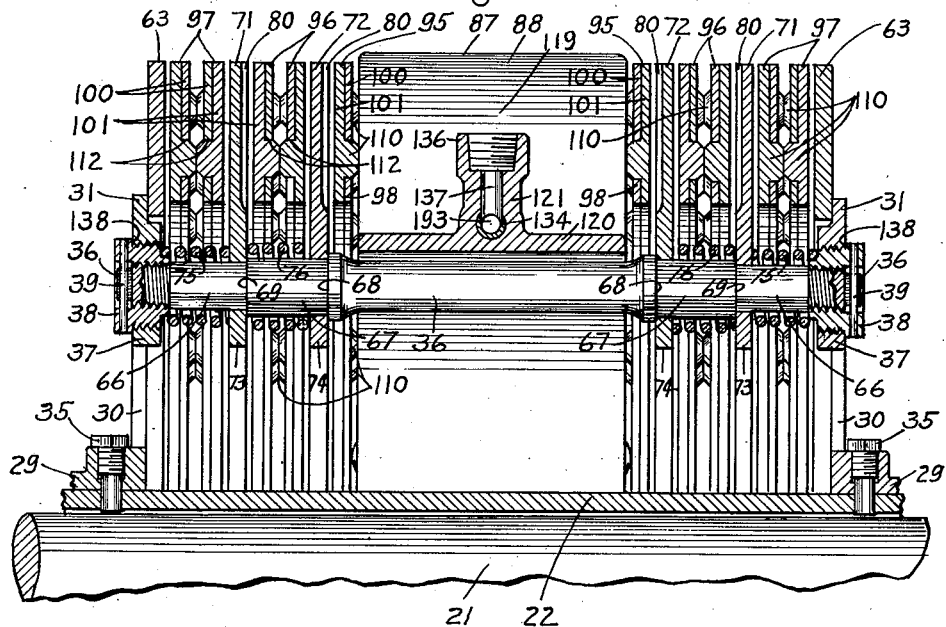
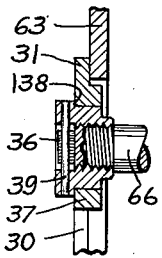
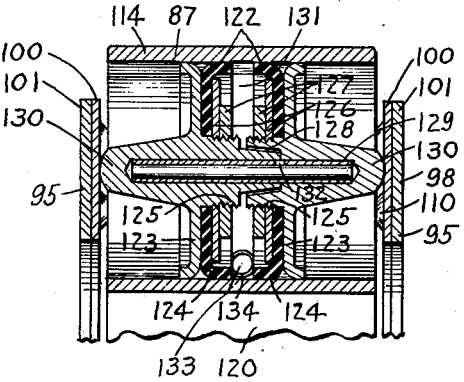
INVENTOR
JOSEPH C. McCUNE
BY
ATTORNEY Oct. 22, 1940.                J. C. McCUNE                 2,218,614
                              VEHICLE BRAKE
                         Filed Aug. 19, 1938           8 Sheets-Sheet 7
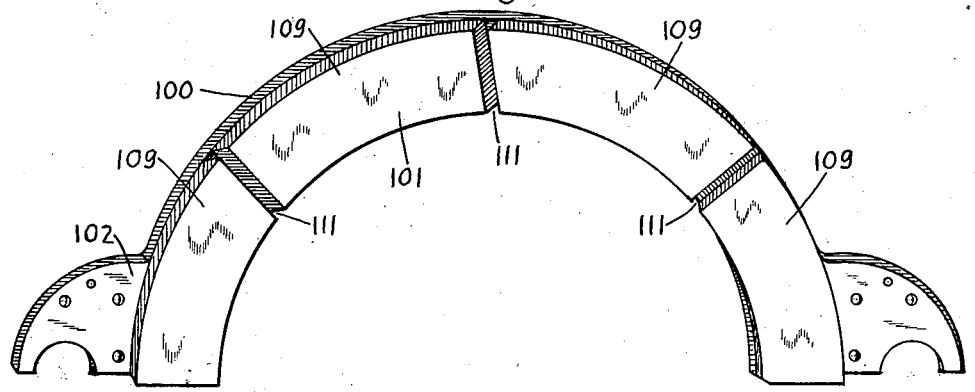
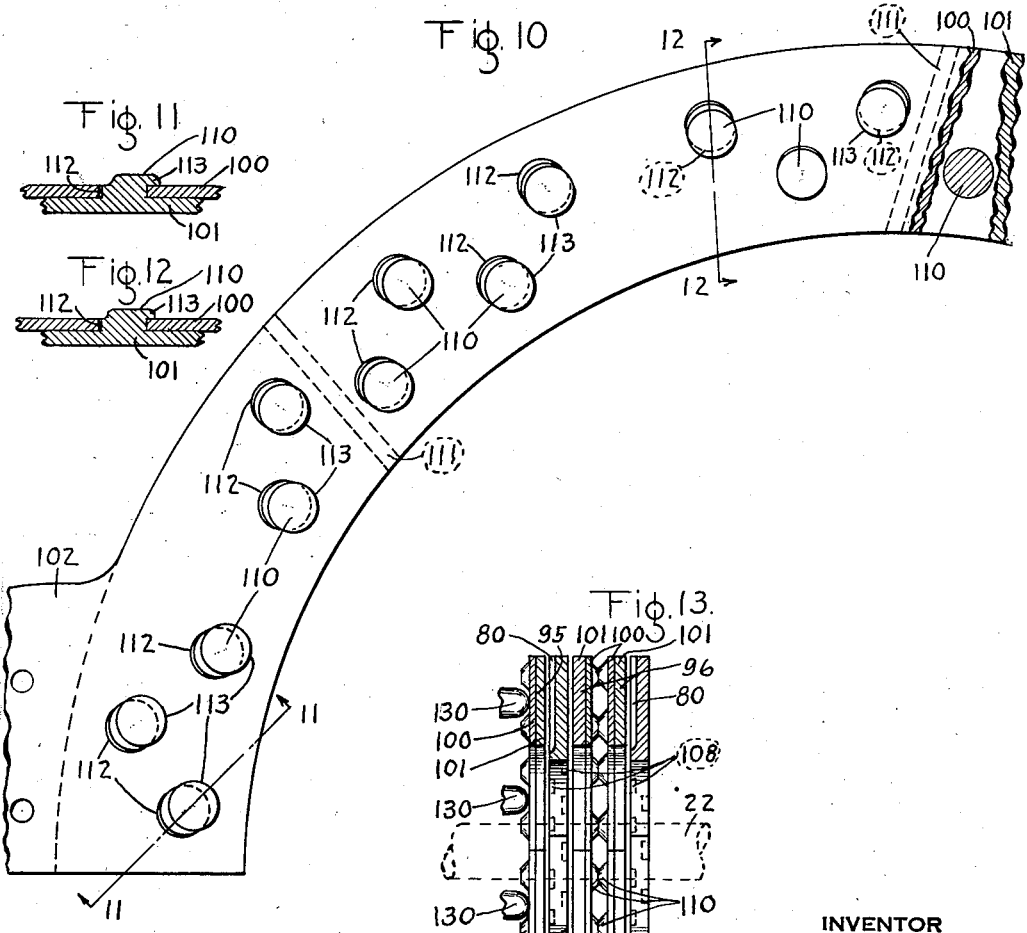
INVENTOR
JOSEPH C. McCUNE
BY
*A. M. Wiggins*
ATTORNEY

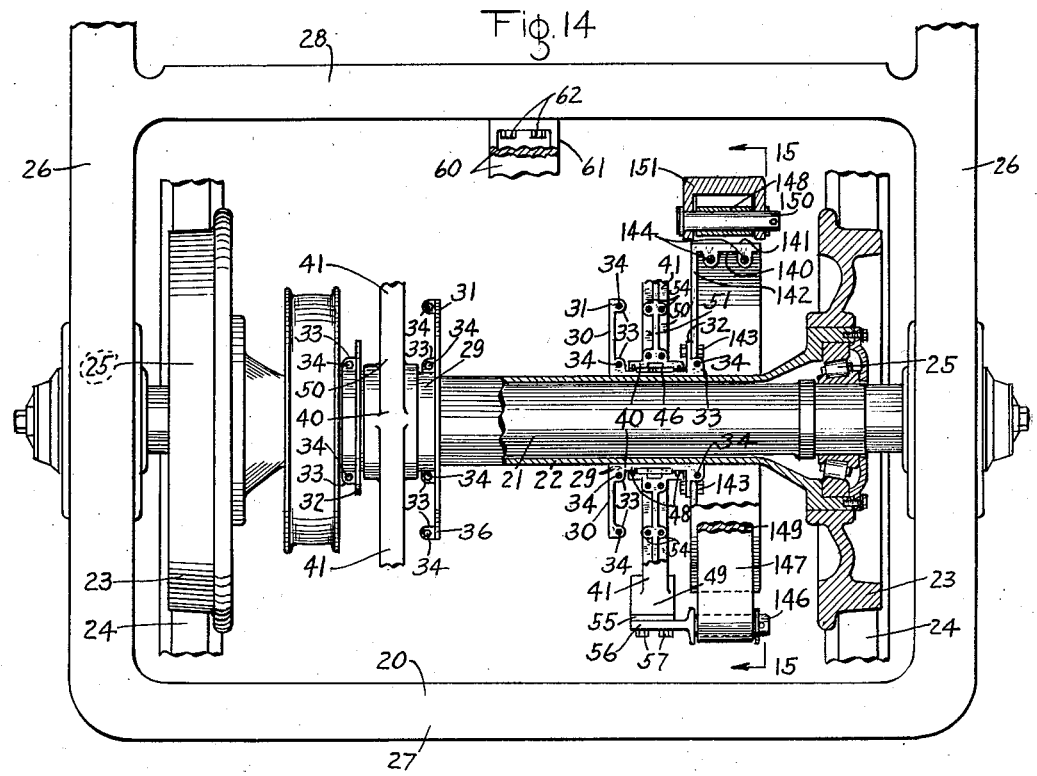

Patented Oct. 22, 1940

2,218,614

UNITED STATES PATENT OFFICE 2,218,614

VEHICLE BRAKE

Joseph C. McCune, Edgewood, Pa., assignor to The Westinghouse Air Brake Company, Wilmerding, Pa., a corporation of Pennsylvania Application August 19, 1938, Serial No. 225,785

54 Claims. (Cl. 188—58)

This invention relates to brake mechanisms for vehicle wheels and more particularly to the friction disc type for use in braking the wheels of railway vehicle trucks; the present application being a continuation in part of my pending application Serial No. 185,179, filed January 15, 1938, now Patent No. 2,174,404, dated September 26, 1939.

One object of the present invention is to provide an improved brake mechanism of the above type adapted to be disposed between and supported by the wheels of a wheel and axle assembly of a vehicle truck and having a direct braking connection with the wheels of such assembly.

Another object of the invention is to provide an improved disc brake mechanism adapted to be carried by the wheels of a wheel and axle assembly of a vehicle truck and embodying a plurality of interleaved rotatable and non-rotatable friction braking elements disposed at the opposite sides of and having a direct operating connection with a fluid pressure operated brake cylinder assembly through the medium of which the operation of said elements to brake said wheels is adapted to be controlled.

Another object of the invention is to provide a disc brake mechanism having improved means for defining the normal or brake release positions of the braking elements in which positions the non-rotatable friction braking elements are disengaged from the rotatable friction braking elements.

Another object of the invention is the provision of a disc brake mechanism adapted to be secured directly to and thus carried by the wheels of a wheel and axle assembly of a vehicle truck and embodying improved means for minimizing vibration of the braking elements relative to the wheels, incident to the wheels engaging irregularities in the track rails or the like, in order to minimize wear in the various parts of the mechanism.

Another object of the invention is the provision of an improved brake mechanism for use on railway vehicle trucks having relatively large friction braking areas, and thus requiring relatively low friction creating or braking pressure for braking the truck wheels.

Another object of the invention is to provide a disc brake mechanism embodying an improved structure for applying an equalized, substantially uniformly distributed braking pressure to the braking elements in order to minimize heating of the elements due to braking and also to provide for long life of the elements.

Another object of the invention is to provide an improved disc brake mechanism the braking elements of which are open to the atmosphere and so arranged that air currents incident to movement of the vehicle are adapted to effect the dissipation of heat therefrom.

Another object of the invention is to provide an improved disc-like braking unit having oppositely disposed friction braking surfaces and so arranged that air currents created by movement of the vehicle are adapted to flow between said surfaces for dissipating heat from the unit.

A still further object of the invention is to provide means for creating a forced flow of air between the braking surfaces of the disc brake elements in order to provide for cooling and efficient braking operation thereof, and also for maintaining the braking surfaces of said elements free of particles of torn metal or the like so as to provide for a most intimate contact between the braking elements during braking and thereby obtain the most efficient braking of the vehicle wheels.

A still further object of the invention is to provide a relatively simple, compact disc brake mechanism which will have relatively long life and which is relatively inexpensive to manufacture, which is readily applicable to wheel and axle assemblies of railway vehicle trucks, and which is readily accessible for inspection, adjustment and repair.

Other objects and advantages will be apparent from the following more detailed description of the invention.

In the accompanying drawings; Fig. 1 is a plan view, partly in section, of a disc brake mechanism embodying the invention and shown associated with a portion of a railway vehicle truck; Figs. 2 to 5 are sectional views taken on the lines 2—2, 3—3, 4—4 and 5—5 in Fig. 1; Fig. 6 is a sectional view taken on the line 6—6 in Fig. 3; Fig. 7 is a sectional view of a portion of the mechanism shown in Fig. 6 and showing a modified form of securing means; Fig. 8 is a sectional view taken on the line 8—8 in Fig. 5; Fig. 9 is an isometric view of one-half of a non-rotatable braking element or brake shoe embodied in the mechanism shown in Fig. 1; Fig. 10 is a view on an enlarged scale of a portion of a non-rotatable braking element shown in Fig. 9 but showing the opposite face of the element; Figs. 11 and 12 are sectional views taken on the lines 11—11 and 12—12 in Fig. 10; Fig. 13 is a diagrammatic view of certain portions of the disc brake mechanism shown in Fig. 1; Fig. 14 is a plan view of a portion of a railway vehicle truck showing associated in oppositely disposed relation therewith certain elements of the improved disc brake mechanism shown in Fig. 1; and Fig. 15 is a sectional view taken on the line 15—15 in Fig. 14.

*Description of parts*

The improved disc brake mechanism is shown associated with a railway vehicle truck which, as shown in Fig. 14 for the purpose of illustration, comprises a truck frame 20 supported on an axle 21. A rigid tube 22 surrounding and spaced from axle 21 is provided at its opposite ends with outwardly flaring, frusto-conical shaped portions rigidly secured in any suitable manner to a pair of oppositely disposed railway vehicle wheels 23 adapted to roll on rails 24. A roller bearing 25 supports each end of the tube 22 and the associated wheel 23 from the axle 21. The tube 22 constitutes a rigid structure adapted to rigidly hold the wheels 23 in proper spaced, operating relation. The tube 22 is also adapted to rotate with the wheels 23 in concentric relation therewith and to carry the disc brake mechanism embodying the invention and to transmit braking force from said mechanism to wheels 23 for effecting braking thereof in a manner later described.

The truck frame 20 comprises the usual side members 26 supported from the axle 21 outside of the wheels 23 and connected together by the usual transversely extending end members 27 and transoms 28.

Only certain portions of the vehicle truck frame are shown, in somewhat diagrammatic form, in the drawings, but this showing is adequate to a clear understanding of the invention.

The improved disc brake mechanism comprises two oppositely disposed, spaced sleeve-like elements 29 clamped around the tube 22 between and preferably equally spaced from the wheels 23. Each of the elements 29 is provided at its inner end with, preferably, four equally spaced radial arms 30 joined together at their outer ends by a ring-like bolting flange 31 which is in concentric relation with tube 22, while at the outer end of each of the elements 29 there is provided an annular bolting flange 32.

Each of the sleeve-like elements 29 is preferably made in two, oppositely disposed complementary sections for application to the tube 22, the line of division between the two sections bisecting two of the oppositely disposed arms 30. Bosses 33 are provided on each of the two halves of each of the elements 29 to receive bolts 34 for rigidly clamping the two halves together and to the tube 22. Between the arms 30 suitable set screws 35 are secured in the sleeve-like elements 29 by screw-threaded engagement and extent into suitable bores in the tube 22 for holding the sleeve-like elements 29 against turning relative to said tube.

The inner bolting flanges 31 of the two sleeves 29 are rigidly connected together by four torque rods 36 which are arranged parallel to the axis of the tube 22 and which are equally spaced around said tube. Each of the rods 36 is rigidly secured at its opposite ends to bosses 37 extending inwardly from the bolting flanges 31, the connection between each end of said rod and each boss 37 constituting a nut 38 having interiorly a screw-threaded connection with the end of the rod and having exteriorly a screw-threaded connection of the same pitch with the respective boss 37. A pin 39 is secured in each of the nuts 38 and extends through a slot in the end of the rod 36 secured in said nut for holding the nut against backing out of the boss 37. It will be noted that the nuts 38 rigidly connect the four rods 36 to the sleeve-like elements 29 and thereby to the vehicle wheels 23.

Each of the sleeves 29 is provided between the bolting flanges 31 and 32 with an annular bearing upon which is journalled a support member 40 having two, oppositely disposed, radial arms 41. A boss 49 having a bore parallel to the axis of tube 22 is provided at the end of each of the arms 41, and extending into these bores for support by said arms are the ends of two bars 42. The bars 42 are disposed diametrically opposite each other at opposite sides of the tube 22 and are arranged parallel to but at a greater distance from the axis of said tube than are torque rods 36.

A resilient bushing 43, made of any desired material such as rubber, is disposed in the bore in the end of each of the arms 41 around the end of the bar 42 therein and is clamped around the bar, in a manner to be later brought out, for securely but resiliently supporting the ends of the bars 42.

Each of the bushings 43 is relieved intermediate its ends preferably by providing an annular groove 44 in the exterior surface thereof, so that as said bushings are clamped around the ends of the bars 42, the end portions of the bushings are permitted to give or expand inwardly of the bores in arms 41 as well as outwardly, so as to thereby insure gripping contact between each of said bushings and two spaced portions of the ends of the bars, the purpose being to securely support the bars in a substantially right angular position with respect to the arms 41, or in other words to provide a substantially rigid connection between the arms 41 of the two supporting members 40.

Each of the support members 40 is formed in two complementary sections to facilitate mounting thereof on sleeves 29. These sections are rigidly connected together by bolts 45 along a line of division bisecting the central journal portion of the member, the arms 41 and the bosses 49 at the end of said arms, and as these sections are drawn together by the bolts 45, the rubber bushings 43 are clamped around the bosses 42 as above described.

The central bearing portion of each of the support members 40 is lined with a self-lubricating bearing 46 for engagement with the bearing on the respective sleeve 29. Each of the bearings 46 is made in halves mounted in the halves of the respective support members 40 and secured against rotation therein in any desired manner, such as by means of keys 47 provided at the opposite ends and interlocking in suitable recesses in the end of the halves of the support members. A dust guard 48, made of felt or the like, is provided in suitable recess at each side of the bearings 46 in the support members 40 and engages the sleeves 29 to keep dirt or other foreign matter out of the bearings between the support members and sleeves.

The arms 41 radiating from the central bearing portion of the support members 40 and connected to the bosses 49 at the ends thereof are in cross-section of substantially I beam configuration. Each of the arms 41 comprises top and bottom flanges 50 so arranged as to resist distortion of the arms in a direction of the length of the tube 22, and connected together by a web structure for resisting distortion of the arms 41 in the direction around the tube 22, said web structure comprising an unbroken central portion 51 extending lengthwise of the arms for providing contact between the halves of the arms throughout their length at their line of division; the central portion of the web being connected to the flanges 50 by relatively thin web arms 52 between which, each of said flanges is supported on its inner face by a relatively shallow strengthening rib 53. Along the central portion 51 of each of the webs suitably spaced, outwardly extending bosses 54 are provided for receiving the bolts 45, the bosses being so arranged that those on one half of the support member engage those on the other half when the two halves are secured together, so as to provide a rigid connection between the halves. Due to this I beam configuration of the arms 41 of support members 40, said members are relatively light in weight, as is very essential in the design of mechanism for attachment to railway vehicles, and also are exceedingly strong and rigid in order to securely hold the parts of the brake mechanism, to be later described, in a predetermined relation at all times.

The two halves of each of the arms 41 are provided beyond the bosses 49 with oppositely disposed abutting flanges 55 which at one side of the tube 22 are rigidly connected together by end plates 56 secured to the flanges by bolts 57. At the opposite side of the tube 22 the flanges 55 at the ends of the arms are rigidly connected by bolts 58 to the opposite, outturned ends of a substantially U-shaped channel like element 59. The central portion of the element 59 is disposed between two jaws 60 of a torque element 61 which is secured in any desired manner, as by bolts 62, to any suitable non-rotating part of the vehicle truck, such as transom 28. Through the medium of torque element 61 and channel element 59, the support members 40, bars 42 and other parts of the brake mechanism carried by said bars and to be later described, are adapted to be held against turning with the wheels 23 at all times. However, the sleeves 29 and rods 36 secured in the bolting flange portions 31 of said sleeves are adapted to turn with wheels 23 in the space between the bars 42.

An annular, ring-like, rotatable friction braking element or disc 63 encircling the rods 36 between the bars 42 and in concentric relation to tube 22, is rigidly secured by bolts 64 to the inside face of the bolting flange 31 on each sleeve 29. The braking elements 63 are each made in two oppositely disposed complementary or substantially semi-circular sections to permit application thereof around the rods 36 against the bolting flanges 31 and are provided with cut out portions for bridging said rods, as clearly shown in Fig. 3 of the drawings.

Each of the torque rods 36 is provided adjacent both threaded ends with a cylindrical bearing portion 66 of at least as great diameter as the threaded ends of the rods, and adjacent this cylindrical portion at each end is another cylindrical portion 67 of slightly greater diameter and which terminates at its inner end in an annular shoulder 68 of still greater diameter; it being noted that an annular shoulder 69 is also formed at the junction of each of the two cylindrical portions 66 and 67.

Between the rotatable elements 63 and adjacent each there are provided two, annular, rotatable friction braking elements or discs 71 and 72 of the same diameter as elements 63, and in concentric relation therewith, with the rotatable elements 71 disposed between the elements 63 and 72.

Each of the rotatable elements 71 is provided with four inwardly extending ears 73 slidably mounted on the cylindrical portions 66 at one end of the torque rods 36, while each of the elements 72 is provided with similar ears 74 slidably mounted on the cylindrical portions 67 at one end of said rods. A release spring 75 is interposed between the inner end of each nut 38 and the ears 73 on the adjacent rotatable element 71 for urging said element into engagement with the shoulders 69, while another release spring 76 is disposed between the ears 73 and 74 on the rotatable elements 71 and 72 for urging the elements 72 into engagement with the shoulders 68. It will be noted that the springs 75 and 76 encircle respectively the cylindrical portions 66 and 67 of the rods 36.

Each of the rotatable braking elements 71 and 72 is also made in two complementary, substantially semi-circular, oppositely disposed sections which are rigidly secured together in abutting relation by means of U-shaped clips 78 which fit over the abutting ends of the sections and which are secured to the sides thereof by bolts 79. These clips are provided for holding the two sections of the rotatable brake elements in operating alignment with each other and against rattling while the brake mechanism is in its brakes released condition, which will be later described, and are also adapted to act in case of breakage of any of the support ears 73 or 74 to hold the sections in their operating condition for thereby preventing damage to the mechanism.

A plurality of equally spaced slots 80 are provided radially across the adjacent faces of each of the two rotatable brake elements 63 and across both of the opposite faces of the rotatable brake elements 71 and 72, for reasons which will be later brought out.

The two bars 42, which are preferably made from tubing in order to keep down the weight of the mechanism, are each provided mid-way between their ends with an annular groove having oppositely disposed side walls or shoulders 81, and at either side of said shoulders, each bar is provided with three cylindrical bearing portions 82, 83 and 84 of different diameters stepped down in the direction of the ends of said bar. A shoulder or stop 85 is thus formed at the junction of each of the cylindrical portions 82 and 83, while another shoulder or stop 86 is formed at the junction of each of the cylindrical portions 83 and 84.

Encircling the torque rods 36 between the bars 42 and in concentric relation with the tube 22 is an annular brake cylinder device 87 comprising upper and lower complementary sections 88 and 89. Each of these sections is provided at its opposite ends with outwardly extending portions 90 adapted to fit on the bars 42 between the shoulders 81, and bolts 91 are provided through the adjacent portions 90 of the two sections at each side of bars 42 for rigidly securing said sections to said bars in end to end abutting relation between the shoulders 81 which act to prevent movement of the device in either direction lengthwise of said bars.

At each side of the brake cylinder device 87 there are provided three annular, non-rotatable friction brake elements or discs 95, 96 and 97 in concentric relation with and interleaved respectively between said device and the rotatable brake elements 72, the rotatable brake elements 72 and 71 and the rotatable brake elements 71 and 63.

Each of the non-rotatable brake elements 95 is made up of upper and lower complementary, substantially semi-circular sections 98 and 99 each of which sections comprises a relatively thin backing plate 100, preferably made of sheet steel, and a semi-circular brake shoe 101 arranged for frictional engagement with the adjacent face of the rotatable brake element 72 and preferably made of cast iron rigidly locked to said plate in a manner to be later described.

Each of the backing plates 100 is provided at its opposite ends with support portions 102 extending slightly past the bars 42 and provided with semi-circular recesses adapted to slidably fit over the cylindrical portions 82 of said bars. The adjacent ends of the portions 102 of the two backing plates 100 in each of the non-rotatable brake elements 95 are rigidly secured in abutting relation by plates 103 secured thereto by bolts 104. Each of the plates 103 has a bore aligned with the semi-circular recesses in the backing plate sections and having a sliding fit on the cylindrical portions 82 of the bars 42.

Each of the non-rotatable braking elements 96 is made up of two braking elements, like the non-rotatable elements 95, but arranged back to back with the brake shoes 101 on the outer faces for engagement with the adjacent faces of the two rotatable brake elements 72 and 71. The two backing plates 100 of each of the non-rotatable elements 96 are secured by bolts 104 to the opposite faces of two spacer plates 105 which are provided with bores aligned with semi-circular recesses in the extended end support portions 102 of the plates and having a sliding fit on the cylindrical portions 83 of the bars 42.

The non-rotatable elements 97 are identical to the non-rotatable elements 96 except that the bores in spacer plates 106, to which the backing plates 100 are secured, and the semi-circular recesses in the end portions 102 of said backing plates are of such size as to have a free sliding fit on the cylindrical portions 84 of the bars 42.

All of the semi-circular sections which go to make up the non-rotatable brake elements 95, 96 and 97 are identical in construction, except for the diameter of the recesses in the end portions 102 thereof. The preferred structure of each of these sections is shown in detail in Figs. 9 to 12 of the drawings from which it will be noted that the shoes 101 are made in a plurality of sections 109 secured to the backing plate 100 by spaced integrally formed rivet like projections 110.

The adjacent ends of each two shoe sections 109 are arranged at an angle to the radius of the element to avoid any possibility of interlocking with the sidewalls of the slots 80 in the adjacent faces of the rotatable braking elements 72, 71 or 63, and are also spaced slightly apart as by slots 111 to minimize warping of the backing plates 100 during the process of manufacture, which will now be described.

Each of the backing plates 100 is punched from sheet steel to the desired size and shape and then provided with a plurality of punched holes 112 located and spaced in predetermined relation throughout the length of the plate.

The punching of the holes 112 provides holes, as is well known, which are of larger diameter at the side of entry of the punch than at the opposite side and which have a slight radius at the edge of larger diameter, both of which features are important factors in rigidly securing the shoe sections 109 to the backing plates 100, as will be now described.

The shoe sections 109 are cast from iron directly on to each backing plate 100. After the mold is made for molding the shoe sections 109 and rivet like elements 110 on to the backing plate 100, the backing plate is placed into the mold with the smaller ends of the punched holes 112 at the side upon which the shoe sections are to be cast. The cast iron is then poured into the mold to form the shoe sections on the one side of the plate and from that side flows through the holes 112 to the opposite side to form the button like rivets 110.

When the molten cast iron strikes the relatively cool backing plate 100, the backing plate expands and moves in the mold relatively to the cast iron in the mold cavities at the two sides of the plate and during this expansion shears part way through the base portions of the buttons 110, which are still in a plastic state. This shearing action provides the majority of the buttons 110 with a substantially semi-circular shoulder 113 which laps over the backing plate 100, as shown, slightly exaggerated for the purpose of clarity, in Figs. 10 to 12 of the drawings. In addition to these shoulders 113, the portion of the button like rivets 110 engaging the side walls of the holes 112 in the plate 100 is tapered, having a larger section at the side of the plate opposite the shoe sections than adjacent the shoe sections, which also act to tightly bind the shoe sections to and thus against movement away from the plate.

Although upon cooling the shoe sections 109 and backing plate 100 retain substantially the same relationship as obtained at the end of the expansion of the backing plate, the slight difference in the coefficient of expansion of the two metals comprising the backing plate and shoe sections is taken advantage of in locating the punched holes 112 in the backing plate, so that the slight movement of the one metal relative to the other upon cooling will effect a high degree of binding between the button like rivets 110 and the side walls of holes 112 in the steel plates 100, in various directions relative to the shoe sections. This binding action in conjunction with the locking action of the tapered rivets 110 and the shoulders 113 formed on the ends thereof secure the shoe sections 109 to the backing plate so tightly as to provide in effect an integral structure.

By making the shoe 101 in a number of spaced sections 109 as above described, warping of the backing plate 100 and consequently of the shoe, which would otherwise occur, is avoided.

After the sections of the non-rotatable elements are made, as just described, the cast faces of the shoe sections 109 are ground in order to remove surface irregularities or the like thereon, while the ends of the rivet like buttons 110 are ground off to a predetermined length measured from the backing plate 100.

The ends of the rivet like buttons 110 are ground off as just described for two reasons. One reason is that in each of the non-rotatable elements 95 certain of these buttons 110 are arranged to engage certain spaced portions of the opposite sides of the brake cylinder device 87 for defining the release position of said elements. Another reason is that in the non-rotatable elements 96 and 97 the buttons 110 in the two backing plates 100 making up these elements, engage each other so as to support the oppositely disposed brake shoes 101 against collapse when subjected on their outer faces to braking pressures, as will be hereinafter described. With the brake shoes 101 and backing plates 100 of the non-rotatable elements 96 and 97 thus supported in spaced relation, a relatively free circulation of air is permitted between the two backing plates 100 thereof, as a vehicle carrying the brake mechanism is moving along a track, and this prevents the transfer of heat, incident to braking, between said brake shoes and also carries away said heat and thus maintains the temperature of said brake shoes at a sufficiently low degree to provide efficient braking.

When molding the brake shoe sections 109 on to a backing plate 100, the cast iron becomes chilled and therefore very hard throughout substantially its entire thickness due to the contact with the relatively cold backing plate, and this provides a shoe structure which will wear for a long period of time.

The non-rotatable braking elements 95, 96 and 97 are somewhat more expensive to manufacture than the rotatable braking elements 72, 71 and 63, in view of which it might be desirable that said rotatable elements be softer than said non-rotatable elements so that said non-rotatable elements will have as long a life as possible consistent with efficient braking. If the rotatable braking elements were thus made of a softer cast iron than the brake shoe sections 109 of the non-rotatable braking elements it will be evident that said rotatable braking elements will have to be renewed from time to time as they become worn out, without, however, renewal of the non-rotatable elements being required. If desired, however, the brake shoe sections 109 on the non-rotatable braking elements may be made softer than the rotatable braking elements so that said non-rotatable elements will wear out first and require renewal.

For urging the two non-rotatable elements 95 to their brake release position against the opposite sides of the brake cylinder device 87, said elements are connected together both above and below both bars 42 by tension springs 115. The opposite ends of the springs 115 may be secured to the non-rotatable elements 95 in any desired manner, but for the purpose of illustration each spring is provided on both ends with a hook like portion which extends through suitably aligned openings in the extensions 102 of the backing plates 100 and the plates 103 secured thereto.

Each of the spacer plates 105 at the opposite ends of the non-rotatable braking elements 96 is provided with an outwardly extending ear 116 having at its end an opening to receive the hooked end of a release spring 117 one of which is provided outside of each of the bars 42 connecting the adjacent ears 116 of the two non-rotatable braking elements 96 for urging said elements to their release position defined by engagement thereof with the shoulders 85 provided on the bars 42. A release spring 118 encircling the cylindrical portion 84 at both ends of the bars 42 is interposed between the ends of the non-rotatable braking elements 97 and the adjacent rubber bushings 43 for urging said elements to their release position defined by the engagement with shoulders 86 on the bars 42.

The two sections 88 and 89 of the annular brake cylinder device 87 are identical in construction and each section is provided with four relatively small brake cylinders 119. The several brake cylinders 119 in the two sections of the brake cylinder devices are equally spaced radially around the tube 22 and each is provided with a through bore opening at the opposite sides of the brake cylinder device, the axis of the several cylinder bores being parallel to the axis of the tube 22 and in alignment with the non-rotatable elements 95 midway between the inner and outer peripheries of said elements.

The several brake cylinders 119 are rigidly secured in spaced relation by a suitable annular, transversely extending web 120 connected to the inner portions of the cylinders and by vertical webs 121 connecting the mid-portions of said cylinders and the end cylinders of each section of the brake cylinder device to the outwardly extending end portions 90 thereof.

Two oppositely disposed brake cylinder pistons 122 are disposed to operate in the bore of each brake cylinder 119. Each of the brake pistons 122 comprises a backing plate 123 having a free sliding fit in the piston bore and having centrally on its inner face an inwardly extending stud portion 125. A flexible, ring-like packing cup 124 is mounted over the stud portion 125 on each piston and is clamped between the backing plate 123 and a ring-like follower plate 126 by a nut 127 screwed on to the stud portion 125.

The stud portion 125 of one piston is provided with an axial extension 128 of reduced and tapering section adapted to be loosely received in a similarly shaped recess in the stud portion 125 of the other piston, and both of said stud portions and said axial extensions are provided with axial bores in which there is disposed a tube 129. One end of the tube 129 is pressed into the piston with the axial recess, while the opposite end has a neat sliding fit in the axial bore in the other piston; the purpose of the tube being to support both of the pistons 122 against binding in the cylinder bore during operation, which will be later described.

Each of the pistons 122 is provided at its outer face with an axial piston stem 130 the end of which is rounded and adapted to engage the backing plate 100 on the adjacent non-rotatable braking element 95 between the button-like rivets 110, said rivets being so arranged as to insure direct contact between the several piston stems 130 and the adjacent backing plates 100.

The outer faces of the several brake cylinder pistons 122 are subject at all times to atmospheric pressure through the open end of the piston bores, while between each pair of said pistons there is provided a pressure chamber 131 to which fluid under pressure is adapted to be supplied for effecting an application of the brakes and from which fluid under pressure is adapted to be released for effecting release of the brakes, in a manner to be later described.

Each of the tubes 129 is provided with a breather hole 132 outside of the section pressed into the one piston and connecting the interior of the tube to the pressure chamber 131 so that the pressure within the tube may at all times equalize with that in said chamber whereby the one piston having a sliding fit on said tube is always free to move relatively thereto.

The pressure chambers 131 in the several brake cylinders 119 are all open to an annular passage 133 which completely encircles the brake cylinder device 87 through a portion at substantially the junction of the transverse web 119 and the vertical webs 120. This passage 133 is provided in each of the brake cylinder device sections 88 and 89 by a semi-circular piece of tubing 134, preferably made of copper and cast in place at the time of molding the brake cylinder sections.

At each end of the two sections of the brake cylinder device there is provided around the end of the tube 134 an annular recess adapted to receive a ring-like gasket 135 which upon securing the two sections of the brake cylinder device together is squeezed between said sections and around the adjacent ends of the copper tubes 134 for effecting a leak proof seal between said sections and tubes. The ends of the copper tubes 134 preferably extend through the central openings in the gasket 135 into substantial abutting relationship so as to prevent said gaskets being displaced inwardly and thereby closing or restricting communication through passage 133 between the two tubes 134. It will be noted that during the process of molding the brake cylinder sections on to the tubes 134, a tight, leak-proof joint may not be obtained between the tubes and the cast metal encircling same; however, this is immaterial since leakage will be effectively prevented from the interior of the tubes to the atmosphere by the gaskets 135 at the ends of the tubes. In other words, the tubes 134 provide a novel and convenient way of obtaining the passage 133 above described and it is not even essential that a leak-proof joint be provided between the exterior of said tubes and the cast metal encircling same.

After the metal forming each section of the brake cylinder device is cast on to the tubes 134, said tubes extends into each of the bores in which the brake cylinder pistons 122 are adapted to operate, and there is no communication between the interior of said pipe and said bores. However, after the sections of the brake cylinder device are cast, the bores in which the brake cylinder pistons 122 are adapted to operate are machined and during this machining operation, the portions of the tubes extending into the piston bores is machined away so as to thereby provide a fluid pressure connection between the passage 133 within the tubes 134 and the interior of the several brake cylinder piston bores, it being noted that the sections of tubes 134 are so located as to be opened to the several piston bores midway between the ends thereof.

Between one adjacent pair of brake cylinders 119 in each of the two sections 88 and 89 of the brake cylinder device, the web 121 is provided on either side with an enlargement 136, as clearly shown in Fig. 6 of the drawings. A port 137 is drilled through these enlargements and the adjacent side wall of the copper tube 134 to the interior of said tube in either one or both of the two sections 88 and 89 making up the brake cylinder device 87. The outer end of this port 137 is preferably provided with screw-threads adapted to be connected to one end of a flexible hose or pipe (not shown) which leads to the brake cylinder connection of an air brake control valve device (not shown). If desired, only the enlargement 136 in the section of the brake cylinder device which it is desired to connect up to the air brake control valve device may be provided with the drilled port 137, however, in case the port 137 is drilled in the enlargement 136 of both of the brake cylinder sections, the one not connected up to the air brake valve device, may be plugged.

*Assembling of brake mechanism*

One method of assembly of the various parts of the improved brake mechanism above described to a vehicle truck is as follows.

First, the two halves of the two sleeve-like elements 29 are mounted around the axle tube 22 and secured together by bolts 34 in the proper, oppositely disposed spaced relation with the openings for the torque rod nuts 38 in one of the sleeves properly lined up with those in the other sleeve for reception of the torque rods 36. The set screws 35 may next be applied or their application may be deferred until after the torque rods 36 are secured in place. In either case, after the sleeve like elements 29 are properly located on the tube 22, holes are drilled in the tube 22 through and in line with the set screw openings already provided in the sleeve-like elements 29, and then the set screws 35 are applied to said elements with the noses of the screws projecting into the bores provided in the tube 22. The set screws then act as hereinbefore described to securely hold the sleeve-like elements 29 against turning on the tube 22.

The torque rods 36, rotatable brake elements 72 and 71 and release springs 76 and 75 are next assembled between the sleeve-like elements 29. In order to effect this assembly, the upper or lower halves of the rotatable brake elements 72 and 71 and the release springs 76 and 75 are assembled in the proper order on two of the rods 36. This assemblage of parts is then inserted at an angle between the flanges 31 of the two sleeve-like elements 29, threading the leading ends of the two rods 36 through the openings for nuts 38 in the adjacent sleeve-like element, after which said rods are pushed into said openings until the opposite ends of the rods clear the inner surface of the opposite sleeve-like element 29. The opposite ends of the rods 36 are then moved into alignment with and inserted into the openings for nuts 38 in the adjacent sleeve-like element. If desired, the springs 75 need not be mounted on the rods 36 until after said rods are assembled to the sleeve-like elements 29 as just described, in which case said springs will be applied over the ends of said rods through the openings for nuts 38. The other two torque rods 36, having mounted thereon in the proper order the other halves of the rotatable brake elements 72 and 71 and the other release springs 76 and 75, are then mounted in a like manner between the sleeve-like elements 29 opposite to the assemblage above described.

After the rods 36 carrying the rotatable braking elements 71 and 72 and the release springs 75 and 76 are thus assembled in place between the two sleeve-like elements 29, the nuts 38 are applied to the opposite ends of said rods and screwed up until an annular shoulder 138 provided on each is jammed up against the outer end of the bosses 37.

The pitch of the threads in the threaded connection between nuts 38 and the rods 36 on the one hand and between said nuts and bosses 37 on the other hand is the same, so that after the nuts are started on to the ends of the rods and then screwed up against the end of the bosses 37 there is no movement between the rods and bosses in a direction lengthwise of the rods and as a consequence there is no stresses set up in the bolting flanges 31 of the sleeve-like elements 29 tending to collapse said flanges inwardly. This is a very desirable feature, since strengthening ribs or the like need not be provided on the sleeve-like elements for opposing said collapse, and said elements may therefore be lighter in weight than would otherwise be practicable. Moreover, these double threaded nuts provided a rigid connection between the ends of the rods 36 and the sleeve-like elements 29 for securely holding said elements in predetermined spaced relation and for transmitting braking forces from said rods to said elements, as will be later described.

Due to the telescopic connection between the bosses 37, nuts 38 and the ends of the rods 36 it will be noted that the over all length of the brake mechanism is kept at a minimum.

After one end of the rods 36 are connected by the nuts 38 to one of the sleeve-like elements 29, some difficulty may occasionally be encountered in having the threads on the opposite ends of the rods line up with those in the adjacent bosses 37 so as to concurrently receive the interior and exterior threads on the other nuts 38. In such a case the bolting flange 31 on one of the sleeve-like elements 29 would have to be deflected slightly and thus placed under a certain degree of strain in order to get these nuts started concurrently on the threads on the rods 36 and in the bosses 37. No difficulty will however be encountered in this respect if proper care is employed in the manufacture and assembling of the parts, but in large quantity production of these braking units this difficulty might occasionally be encountered. It is undesirable to place the bolting flanges 31 of the sleeve-like elements 29 under a strain tending as to cause inward collapse thereof due to reasons such as above described, and this may be avoided by providing either one or both of the nuts 38 on each of the torque rods 36 with a smooth exterior cylindrical surface adapted to have a snug turning fit in a smooth cylindrical bore in the respective boss or bosses 37, as shown in Fig. 7 of the drawing. Where either one or both of the nuts 38 has a smooth exterior surface, such nuts will not of course secure the bolting flanges 31 against spring in the direction towards each other, but since said nuts are screwed on to the ends of the rods 36 until the shoulders 138 on the nut firmly contact the end of the respective bosses 37 said nuts and rods will support the bolting flanges 31 against movement away from each other as is essential during braking.

The simplest structure is of course one in which the exterior surface of nuts 38 employed on both ends of the rods 36 is smooth and cylindrical as shown in Fig. 7 of the drawings, but there is an advantage in having one of the nuts on each rod exteriorly threaded to the boss 37, as shown in Fig. 6, this advantage being that such nuts will tend to hold the respective rods and rotatable elements 71 and 72 carried thereby in such a condition with respect to the other parts of the brake mechanism as would prevent possible damage to the mechanism in case for instance the nuts having a smooth exterior surface should work loose and fall from the rods.

After the rotatable braking elements 71 and 72 carried by the several torque rods 36 are thus secured to the two sleeve-like elements 29 through the medium of the nuts 38, the two parts of each of said braking elements are secured in aligned, substantially abutting relation by means of the clips 78 and bolts 79. It is here desired to point out that the clips 78 are provided to hold the parts of the rotatable brake elements against rattling when the brakes are released, and are also adapted to act to secure the lower halves of said rotatable brake elements against dropping on to the track rails 24 in case of breakage of the ears 74 securing the lower halves of said elements to the rods 36. The clips 78 are not an essential part of the mechanism in so far as braking operation is concerned, since regardless of the relative positions of the two halves of the rotatable brake elements, at the time ar application of brakes is effected, said halves will be moved into braking alignment with each other upon being squeezed between the non-rotatable brake elements at either side thereof, as will be later described.

Figure 3:
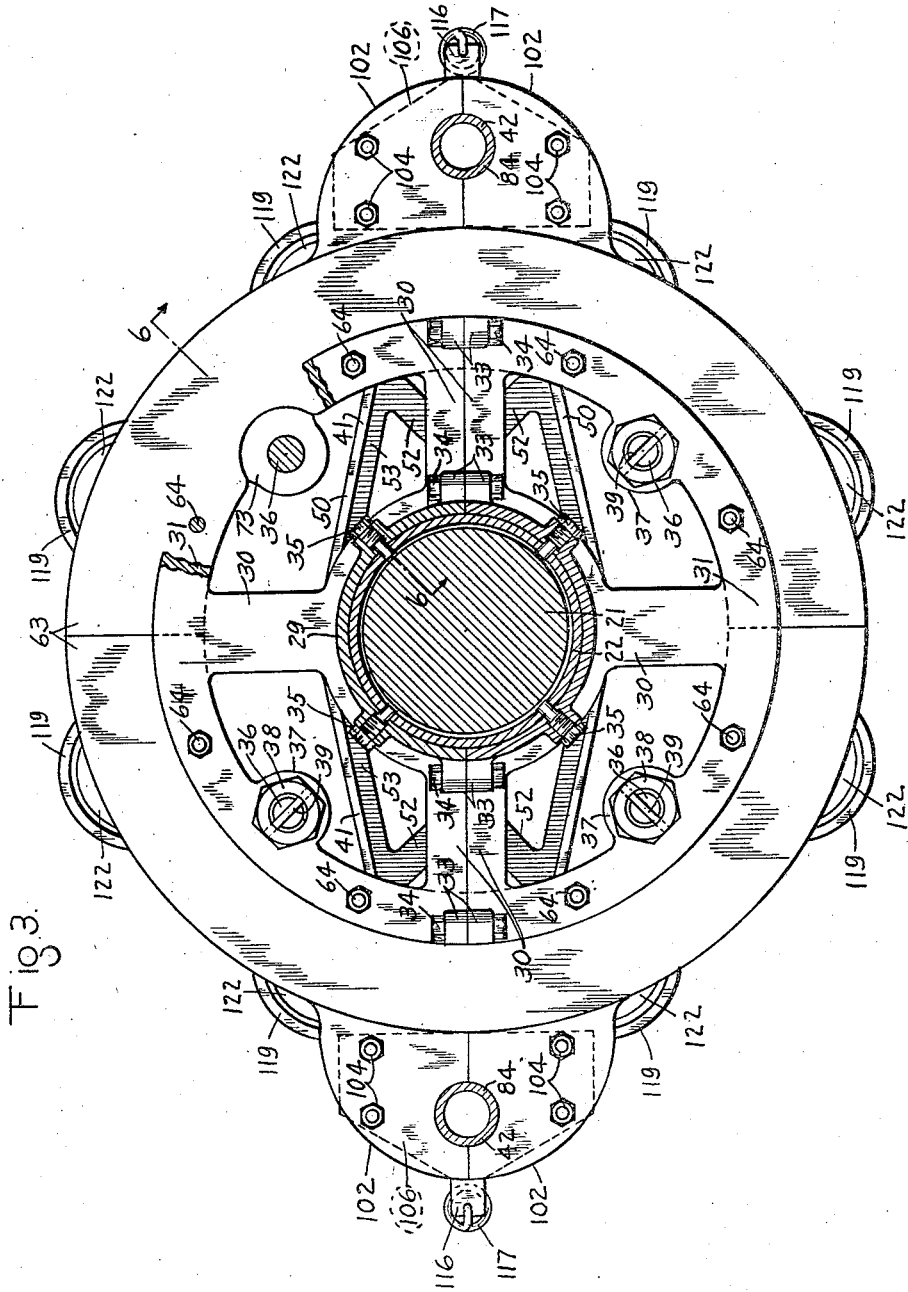
Figure 4:
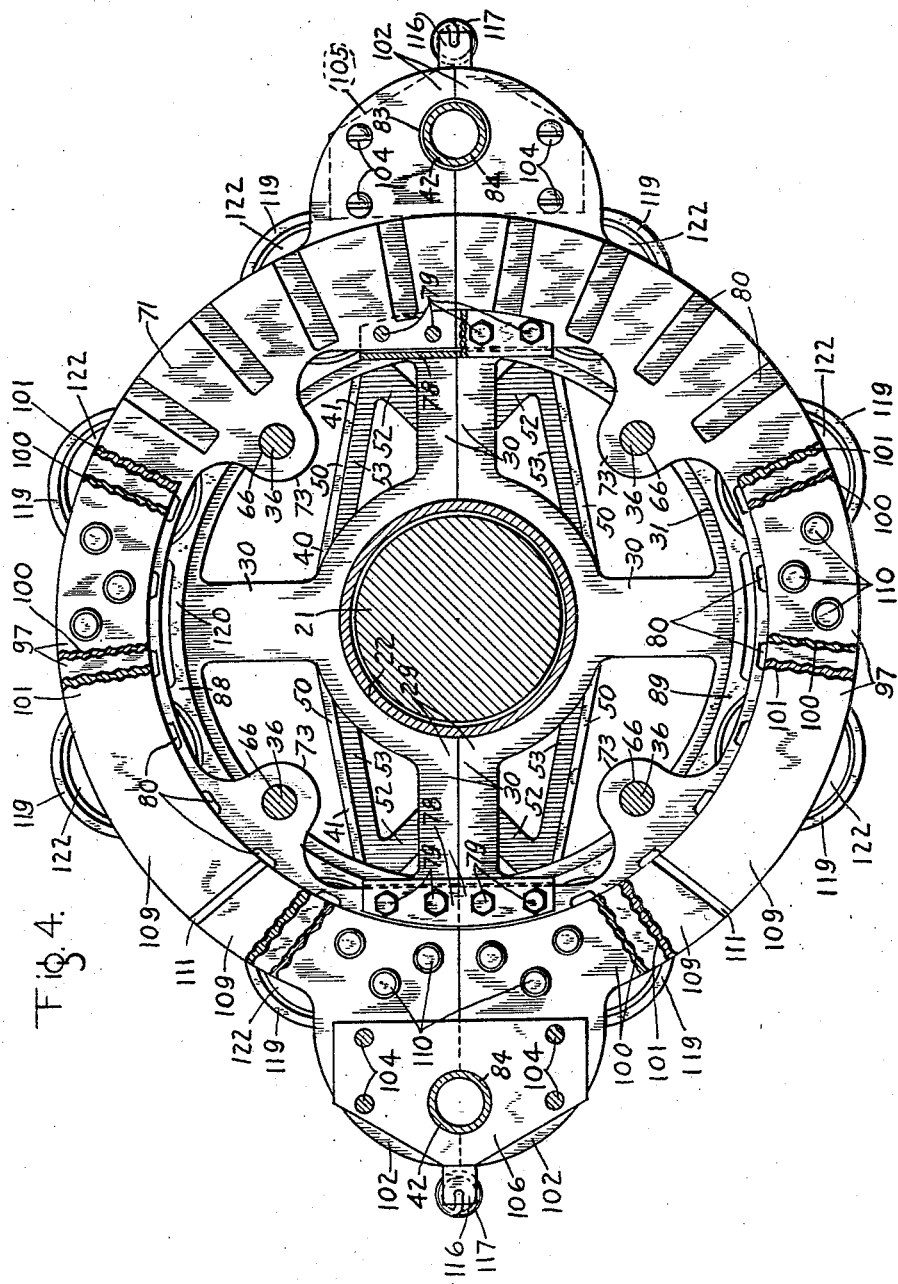

After the rods 36 and rotatable elements 72 and 71 are mounted on the sleeve-like elements 29 the semi-circular sections of the rotatable brake elements 63 are secured by bolts 64 to the end flanges 31 of said sleeve-like elements with the line of division between the two sections of each element preferably arranged at right angles to that between the two parts of the sleeve-like elements, as shown in Fig. 3 of the drawings.

The end plates 103 and spacer plates 105 and 106 are next mounted on the cylindrical portions 82, 83 and 84, respectively, of the bars 42 and then the springs 118 are slipped over the opposite ends of said bars into engagement with the spacer plates 106. The halves of the rubber bushings 43 are next positioned in the two halves of the support members 40 and then the halves of said support members are positioned from above and below the tube 22 on the bearings on the sleeve-like elements 29 and then secured together and to said bearings by the bolts 45. The bars 42 having the end plates 103, spacer plates 105 and 106 and springs 118 mounted thereon may if desired be positioned between the halves of the support members 40 before said halves are secured together or if desired may be inserted first through one of the bushings 43 and then the other before the bolts 45 are drawn up tight. In either case, before the bolts 45 are fully tightened for securing the two halves of each of the support members 40 together into, in effect, a substantially rigid structure, both of the bars 42 are adjusted lengthwise of the bushings 43 so as to centralize the oppositely disposed shoulders on the bars between the support members 40.

The upper and lower sections of the non-rotatable braking elements 95 are then assembled from above and below the tube 22 to their working position adjacent the inner faces of the rotatable braking element 72 and rigidly secured to the end plates 103 by means of the bolts 104. The oppositely disposed upper and lower sections of the non-rotatable braking elements 96 are then applied in a similar manner between the rotatable braking elements 72 and 71 and secured by bolts 104 to the spacer plates 105, and finally the oppositely disposed upper and lower sections of the non-rotatable braking elements 97 are applied around the tube 22 in a like manner between the rotatable braking elements 71 and 63 and secured by bolts 104 to the spacer plates 106.

After the non-rotatable braking elements are secured to the bars 42, the two oppositely disposed halves of the brake cylinder device 87 are mounted on said bars from above and below the tube 22 and rigidly secured together and to said bars between the shoulders 81 by means of the bolts 91.

The release springs 115 are next connected to the non-rotatable brake elements 95, both above and below the bars 42, for urging said non-rotatable elements to their release position defined by engagement thereof with the opposite sides of the brake cylinder device 87. The release springs 117 are then hooked into the ears 116 projecting from the spacer plates 105 of the non-rotatable elements 96, for urging said elements into engagement with the shoulders 85 on the bars 42 which define their normal release position. The springs 118 as assembled with the bars 42 in the support members 40 are conditioned to act to urge the non-rotatable braking elements 97 into engagement with the shoulders 86 for defining the normal release position of said elements.

After the non-rotatable braking elements 95, 96 and 97 and the brake cylinder device 87 are thus secured to the bars 42, said bars may be shifted, in the direction of their length if necessary, upon loosening of the bolts 45, for centralizing the outside non-rotatable braking elements 97 with the end rotatable braking elements 63, following which, the bolts 45 are tightened for rigidly securing these parts in their adjusted condition. If it is then necessary to centralize the rotatable braking elements 71 and 72 between the several non-rotatable braking elements 95, 96 and 97, the rods 36 may be turned in the nuts 38 for shifting said rotatable braking elements in either one direction or the other to the desired centralized position. After the rotatable braking elements are thus centralized the pins 39 are driven through the ends of the nuts 38 and the slots in the ends of the rods 36 for securing said rods against turning in the nuts out of the adjusted position.

Finally the end plates 56 are secured to the flanges 55 at the ends of the support member arms 41 at one side of the tube 22 for securely holding the ends of the two halves of said arms against spreading. At the opposite side of tube 22 the ends of the channel shaped element 59 are then secured by bolts 58 to the adjacent ends of the two halves of the support member arms 41 for rigidly securing same against spreading. The element 61 may be secured by bolts 62 to the transom 28 when ever desired, it being noted however that if applied before the channel shaped element 59 is secured to the arms 41 of members 40, said channel shaped element must be placed between the jaws 60 before being secured to the ends of the arms 41 of the support members 40.

The brake mechanism is assembled as above described with the rotatable braking elements 63, 71 and 72 secured to the tube 22 for rotation with the car wheels 23, and with the non-rotatable braking elements 95, 96 and 97 supported on said tube through the medium of the bars 42, support members 40 and sleeve-like elements 29 and secured against turning with the wheels 23 due to the connection with the truck frame through the medium of the torque element 61, and when thus assembled is in condition for operation to effect deceleration or stopping of the truck wheels 23.

For controlling the operation of the improved brake mechanism, the port 137 in the brake cylinder device 87 is connected by a flexible tube or the like to an air brake control valve device (not shown) of any suitable type such for instance of the type employed on railway vehicles which is operative to supply fluid under pressure to said port for effecting an application of the brakes and which is operative to release fluid under pressure from said port when it is desired to effect a release of the brakes after an application.

*Operation*

In operation, when it is desired to decelerate or stop rotation of the truck wheels 23, or in other words effect an application of the brakes on the truck, fluid under pressure is supplied to port 137 in the brake cylinder device 87 and from thence flows into passage 133 completely around the brake cylinder device. From passage 133 fluid under pressure flows substantially simultaneously into the pressure chambers 131 between the brake cylinder pistons 122 in the several brake cylinders 119 and therein acts on the pistons 122 to move the pistons in each brake cylinder in a direction away from each other.

This outward movement of the brake cylinder pistons 122 acts through the piston rods 130 to slide the two non-rotatable braking elements 95 against the resistance of springs 115 in opposite directions on the cylindrical portion 82 of bars 42 into engagement with the adjacent faces of the rotatable braking element 72. As pressure is thus applied by the brake cylinder pistons through the non-rotatable elements 95 to the rotatable braking elements 72, said rotatable elements are slipped along the cylindrical portions 67 of torque rods 36 against the pressure of springs 76 into contact with the adjacent faces of the non-rotatable braking elements 96, which are then picked up and moved along the cylindrical portions 83 of bars 42 against the pressure of springs 117, into contact with the adjacent faces of the rotatable braking elements 71. Pressure applied by the non-rotatable braking elements 96 to the rotatable braking elements 71 then shifts said rotatable braking elements on the cylindrical portions 66 of the torque rods 36 against the pressure of springs 75 into contact with the adjacent faces of the non-rotatable braking elements 97 which are then moved on the cylindrical portions 84 of bars 42 against the pressure of the springs 118 into contact with the adjacent faces of the rotatable braking elements 63. The rotatable braking elements 63 being secured to the bolting flanges 31 of the sleeve-like element 29 are fixed against movement relative to the tube 21 in an axial direction and thereby act as stops for preventing further outward movement of the braking elements.

After the braking elements at the opposite sides of the brake cylinder device are thus all moved into engagement with each other, the pressure of fluid in chambers 131 acting on the several pairs of brake cylinder pistons 122 forces the several rotatable and non-rotatable braking elements into frictional braking engagement with a pressure which varies according to the pressure of fluid acting in pressure chamber 131. As a result, the non-rotatable braking elements act to brake and thus slow down rotation of the rotatable braking elements and thereby of the wheels 23 of the truck, and the degree of this retardation may be governed as desired by the pressure of fluid supplied to the pressure chambers 131.

When the several braking elements are forced into frictional braking engagement as above described it will be noted that the rods 36 not only act to receive braking torque applied to the braking elements 71 and 72 and transmit same to the sleeve-like elements 29 for retarding rotation to the wheels 23, but said rods also act through the connections between the nuts 38 and the bolting flanges 31 of the sleeve-like elements 29 to hold the rotatable braking elements 63 against outward movement when subjected to braking pressure from the non-rotatable braking elements 97, so as to thereby avoid subjecting the several arms 30 of the sleeve-like elements 29 to strains which otherwise would tend to cause breakage thereof.

It will be also noted that the torque member 61 holds the non-rotatable braking elements 95, 96 and 97 against rotation in order to effect braking of the rotatable braking elements 72, 71 and 63. The degree of force required to thus support the non-rotatable elements against rotation during braking is only a small percentage of that applied by the several brake cylinder pistons to the braking elements and will thus not seriously affect or interfere with the usual free vertical movement of the truck frame 10 with respect to the truck wheels 23, and any such effect is further minimized due to the fact that the torque connection between the non-rotatable braking elements and truck frame is preferably made to the transom 28 which is located close to the longitudinal center of the truck.

The frictional braking engagement between the several non-rotatable and rotatable friction braking elements of the brake mechanism creates a large amount of heat the greater part of which it is necessary to dissipate during braking in order to maintain the temperature of said braking elements sufficiently low to provide efficient braking of the truck wheels 23. In order to thus dissipate the heat generated in the braking elements during braking the slots 80 are provided in the braking faces of the several rotatable braking elements 72, 71 and 63. These slots act upon rotation of the rotatable braking elements as a fan to create a forced circulation of air from the interior of the mechanism across the braking faces of the several braking elements and from thence to the atmosphere which carries away a tremendous amount of the heat created and thus maintains the braking elements at a temperature which provides efficient braking. The slots 80 also act in braking to receive particles of metal torn from the braking elements or any other foreign matter and to discharge same to the atmosphere so as to thereby maintain a most intimate braking contact between the braking faces of the several braking elements.

The faces of the rotatable braking elements 95 adjacent the brake cylinder device 87 are spaced from said brake cylinder device by the button-like rivets 110, so that with a vehicle in motion a stream of air is adapted to flow between said elements and the brake cylinder device for thereby dissipating heat from said elements and for also preventing the transfer of heat from said elements to the brake cylinder device 87. It will also be noted that since the oppositely disposed braking portions of the non-rotatable braking elements 96 and 97 are held in spaced relation by the button-like rivets 110, air is adapted to flow between said portions of said elements around said rivets while a vehicle is under motion and this air is adapted to dissipate heat from said elements.

Disc brake mechanisms embodying piles of interleaved rotatable and non-rotatable braking elements such as above described have hereinbefore been proposed for the braking of vehicles such as employed on railroads but have not been satisfactory due partly to the lack of efficient means for dissipating the heat from the friction braking elements during braking. If this heat is not dissipated the braking elements will either, in effect, burn up or the coefficient of friction between the braking surfaces will become reduced to a very low and ineffective degree. In the present mechanism however, these difficulties are avoided by the practical, efficient cooling arrangement above described.

When it is desired to effect a release of the brakes on the truck after an application fluid under pressure is vented from the passage 137 and thereby from the several pressure chambers 131 between the sets of the brake cylinder pistons 122. As the pressure of fluid is thus relieved on the brake cylinder pistons 122 the pressure urging the non-rotatable and rotatable friction braking elements into engagement is relieved and permits the several springs acting on said elements to return said elements to their release position defined by the shoulders on the rods 36 and on the bars 42, hereinbefore described. When the braking elements are in their release position they are all out of contact with each other so that the rotatable braking elements 63, 71 and 72 are free to rotate with the truck wheels 23, as will be evident.

Replacement of parts

Due to the relatively large braking area provided by the use of the several braking elements of the improved brake mechanism and also due to the relatively low braking pressures which it is therefore necessary to apply to said braking elements by the several relatively small brake cylinder pistons 122 for braking the truck, and further since the pressure applied by said pistons to the braking elements is substantially equally distributed over the braking areas thereof, the life of the several braking elements will be relatively long as compared to the conventional type of brake equipment employing brake shoes for frictionally engaging the truck wheels.

It may be that the life of the various elements making up the brake mechanism will be sufficiently long that a complete overhaul of the mechanism will be desired before the need for replacement of any of the parts. Replacement of certain parts may however become necessary due to breakage or in case, for instance, the rotatable friction braking elements should be made of harder material than the non-rotatable friction braking elements and it would be desired to effect replacement of certain of the non-rotatable braking elements before the time for complete overhaul of the mechanism.

Replacement of any of the non-rotatable braking elements may be made merely by removal of the required bolts 104 and then either dropping or raising the section or sections of said elements to be replaced, and then applying a new section followed by the replacement by the bolts 104. The section or sections of the non-rotatable elements to be removed are of course disconnected from their respective release springs and said springs again connected up to the new portions applied.

Replacement of the outside rotatable braking elements 63 may be made merely by removal of the required bolts 64 and then of the part to be replaced and substitution therefor of a new part with replacement of said bolts, as will be evident.

In case however it is necessary or desirable to replace either a part or all of either of the rotatable braking elements 71 and 72 it is necessary to remove not only the brake cylinder device 87 from the rods 42 but also all of the non-rotatable braking elements 95, 96 and 97. After the parts are removed the nuts 38 are removed from the ends of the required rods 36 following which said rods and the rotatable braking elements carried thereby are removed from the bolting flanges 31 of the sleeve-like elements 29 in a manner just the reverse of application to said flanges, hereinbefore described. The worn or broken parts of the rotatable braking elements are then removed from the torque rods 36 and replaced by new parts after which said rods are reassembled along with other parts of the mechanism in the same manner, as hereinbefore described.

*Auxiliary brake*

All railway vehicles must be provided with an auxiliary brake which is operable by hand for holding the vehicle stopped. According to the present invention an auxiliary hand operated brake of the drum type is associated with the disc brake mechanism above described.

The auxiliary brake comprises a brake drum 140 having an outer cylindrical braking surface 141 and having an inwardly extending flange portion 142 encircling the tube 22 at the outer end of one of the sleeve-like bearing elements 29 and secured to the bolting flange 32 of said element by a plurality of spaced bolts 143. The brake drum 140 is preferably made in two complementary sections to facilitate assembly around the tube 22, said sections being rigidly secured together by bolts 144 provided through lugs projecting from the inside surface of the drum.

The end plate 56 adjacent the brake drum 140 is provided with two spaced outwardly projecting pins 146, disposed one above the other. Secured to the upper pin 146 is one end of a substantially semi-circular brake band 147 extending over the top surface of the brake drum 140, while secured to the lower pin 146 is one end of a brake band 148 extending around the lower portion of the drum 140.

Each of the brake bands 147 and 148 is lined with a friction shoe 149 made of any suitable material, and adapted to frictionally engage the surface 141 of the brake drum for effecting braking thereof and thereby of the connected truck wheels 23. The opposite ends of the two brake bands 147 and 148 are operatively connected to two spaced pins 150 which are secured to a cam 151. The cam 151 is provided with a lever 152 for rocking the cam and said lever is connected by a cable 153 or the like to the usual hand brake wheel or lever (not shown) provided on railway vehicles.

*Operation of auxiliary brake*

When it is desired to apply the auxiliary brake to hold the vehicle truck stopped, the hand wheel or lever (not shown) on the vehicle is operated to pull on the cable 153 for thereby rocking lever 152 and cam 151 in a counterclockwise direction. This movement of the cam 150 acts to contract the two brake bands 147 and 148 around the drum 140 and force the brake shoes 149 on the inner faces of said bands into frictional braking engagement with the peripheral braking surface 141 of the drum, and due to this frictional gripping contact said drum and thereby the wheels 23 are adapted to be held against turning. When it is desired to release the auxiliary brakes, the usual hand wheel or lever on the vehicle is released thereby releasing the tension in the cable 153 and permitting the lever 152 and cam 151 to rock in a clockwise direction for thereby relieving the pressure between the brake shoes 149 on the brake bands and the drum 140, so that the drum is free to rotate with the truck wheels.

From the above description it will be noted that the improved disc brake mechanism is relatively simple, compact and inexpensive to manufacture. The various parts are so designed as to facilitate application to and removable from a vehicle truck without disassembling of the truck and so as to also facilitate inspection, adjustment and repair. Further, the parts of the mechanism are so designed and arranged as to minimize vibration and wear of the parts, and to efficiently dissipate heat therefrom so as to provide efficient braking operation thereof over a long period of time.

While one illustrated embodiment of the invention has been described in detail it is not the intention to limit the scope to this embodiment or otherwise than by the terms of the appended claims.

Having now described my invention, what I claim as new and desire to secure by Letters Patent, is:

1. In a brake mechanism for a wheel and axle assembly of a vehicle truck, annular rotatable friction braking elements and annular non-rotatable friction braking elements located between said wheels encircling said axle and adapted upon frictional interengagement to brake said wheels, a rigid member encircling said axle and spaced therefrom and secured at opposite ends to said wheels and carrying said rotatable braking elements for rotation with said wheels, a non-rotatable structure journaled on said member and supporting said non-rotatable braking elements, and means carried by said structure for actuating said brake elements.

2. In a brake mechanism for a wheel and axle assembly of a vehicle truck, annular rotatable friction braking elements and annular non-rotatable friction braking elements located between said wheels encircling said axle and adapted upon frictional interengagement to brake said wheels, a rigid member encircling said axle and spaced therefrom and secured at opposite ends to said wheels, a pair of sleeve-like elements secured to said rigid member in oppositely disposed spaced relation carrying said rotatable braking elements, a structure journaled on said sleeves supporting said non-rotatable braking elements, and means carried by said structure for actuating said braking elements.

3. In a brake mechanism for a wheel and axle assembly of a vehicle truck, annular rotatable friction braking elements and annular non-rotatable friction braking elements located between said wheels encircling said axle and adapted upon frictional interengagement to brake said wheels, a rigid member encircling said axle and spaced therefrom and secured at opposite ends to said wheels, a pair of sleeve-like elements secured to said rigid member in oppositely disposed spaced relation carrying said rotatable braking elements, a structure journaled on said sleeves supporting said non-rotatable braking elements, and means carried by said structure for actuating said braking elements, said annular braking elements, sleeves, and structure being made in complementary sections fitted around said rigid member in oppositely disposed relation and secured thereto in working relation and being removable therefrom upon movement away from said rigid member in a radial direction.

4. In a brake mechanism for a pair of laterally spaced wheels of a vehicle truck, annular rotatable friction braking elements and annular non-rotatable friction braking elements adapted upon frictional interengagement to brake said wheels, a rigid structure extending between and connected to said wheels, a pair of sleeve-like elements encircling and secured in spaced relation to said structure and carrying said rotatable braking elements, a support member journaled at all times on each of said sleeve-like elements, said support members carrying said non-rotatable braking elements, and a member rigidly connected to both of said support members and having a single torque connection with said truck for holding said support members and non-rotatable braking elements against rotation with said rotatable braking elements.

5. In a brake mechanism for a pair of laterally spaced wheels of a vehicle truck, annular rotatable friction braking elements and annular non-rotatable friction braking elements adapted upon frictional interengagement to brake said wheels, a rigid structure extending between and connected to said wheels and carrying said rotatable braking elements for rotation with said wheels, a pair of sleeve-like elements encircling and secured in spaced relation to said structure, a support member journaled at all times on each of said sleeve-like elements, said support members carrying said non-rotatable braking elements, and a rigid member secured at opposite ends to said two support members and having midway between its ends a torque connection with said truck for holding said support members and non-rotatable braking elements against rotation with said rotatable braking elements.

6. In a brake mechanism for a wheel and axle assembly of a vehicle truck, annular rotatable friction braking elements and annular non-rotatable friction braking elements adapted upon frictional interengagement to brake said assembly, means securing said rotatable braking elements to said assembly for rotation therewith, a pair of support members spaced longitudinally of and having journal connections at all times with said assembly for supporting said non-rotatable braking elements in braking relation with said rotatable braking elements, and a member connected to each of said support members and having intermediate its ends a single connection with a portion of said truck for holding said support members and non-rotatable braking elements against rotation with said rotatable braking elements.

7. In a brake mechanism for a pair of laterally spaced wheels of a vehicle truck, annular rotatable friction braking elements and annular non-rotatable friction braking elements operative upon frictional interengagement to brake said wheels, a rigid structure encircled by said braking elements and secured to said wheels and supporting said rotatable braking elements for rotation with said wheels, a pair of spaced support members journaled on said rigid structure, spaced bars carried by said support members supporting said non-rotatable braking elements, and resilient means providing supporting connections between said bars and each of said support members on two spaced portions of said bars in each connection.

8. In a brake mechanism for a pair of laterally spaced wheels of a vehicle truck, annular rotatable friction braking elements and annular non-rotatable friction braking elements operative upon frictional interengagement to brake said wheels, a rigid structure encircled by said braking elements and secured to said wheels and supporting said rotatable braking elements for rotation with said wheels, a pair of spaced support members journaled on said rigid structure, spaced bars carried by said support members supporting said non-rotatable braking elements, and a resilient bushing clamped in each connection between said bars and support members and bearing against two spaced portions of the bar.

9. In a brake mechanism for a pair of laterally spaced wheels of a vehicle truck, annular rotatable friction braking elements and annular non-rotatable friction braking elements operative upon frictional interengagement to brake said wheels, a rigid structure encircled by said braking elements and secured to said wheels and supporting said rotatable braking elements for rotation with said wheels, a pair of spaced support members journaled on said rigid structure, spaced bars carried by said support members supporting said non-rotatable braking elements, and a resilient bushing clamped in each connection between said bars and support members, each of said bushings having an annular groove between the end portions thereof for providing resilient connections with said bars only at the end portions of the bushings.

10. In a brake mechanism for a pair of laterally spaced wheels of a vehicle truck and comprising annular, rotatable friction braking elements and annular, non-rotatable friction braking elements operative upon frictional interengagement to brake said wheels, a rigid element extending between and connected to said wheels and supporting said rotatable braking elements for rotation with said wheels, and a structure carried by said rigid element for supporting said non-rotatable braking elements, said structure comprising a support member having a central bearing portion journaled on said rigid element and having oppositely disposed arms, I shaped in cross-section, radiating from said journal portion and supporting said non-rotatable braking elements.

11. In a brake mechanism for a pair of laterally spaced wheels of a vehicle truck and comprising annular, rotatable friction braking elements and annular, non-rotatable friction braking elements operative upon frictional interengagement to brake said wheels, a rigid element extending between and connected to said wheels and supporting said rotatable braking elements for rotation with said wheels, and a structure carried by said rigid element for supporting said non-rotatable braking elements, said structure comprising a support member having a central bearing portion journaled on said rigid element and having oppositely disposed arms, members carried by said arms at the ends thereof supporting said non-rotatable braking elements, said arms between the ends thereof and said bearing portion being I shaped in cross-section.

12. In a brake mechanism for a pair of laterally spaced wheels of a vehicle truck and comprising annular, rotatable friction braking elements and annular, non-rotatable friction braking elements operative upon frictional interengagement to brake said wheels, a rigid element extending between and connected to said wheels and supporting said rotatable braking elements for rotation with said wheels, and a structure carried by said rigid element for supporting said non-rotatable braking elements, said structure comprising a support member having a central bearing portion journaled on said rigid element and having oppositely disposed arms, radiating from said bearing portion and supporting at their ends said non-rotatable braking elements, said support member comprising two complementary parts having T shaped arm sections secured together along a line bisecting said bearing portion and said arms to form arms I shaped in cross-section.

13. In a brake mechanism for a pair of laterally spaced wheels of a vehicle truck and comprising annular, rotatable friction braking elements and annular, non-rotatable friction braking elements operative upon frictional interengagement to brake said wheels, a rigid element extending between and connected to said wheels and supporting said rotatable braking elements for rotation with said wheels, a pair of oppositely disposed bars, one at either side of said rigid element for carrying said non-rotatable braking elements, a pair of spaced support members journaled on said rigid element and carrying said bars, each of said support members comprising a central bearing portion journaled on said rigid element, a pair of oppositely disposed arms, I shaped in cross-section, radiating from said bearing portion and having end portions for supporting the ends of said bars, each of said support members comprising two oppositely disposed complementary sections secured together along a line bisecting the central bearing portion and arms thereof and each section of said arms between the end portion thereof and the central bearing portion being T shaped in cross-section comprising an outer flange, and a longitudinally extending web at the line of division connected to said flange for supporting same.

14. A brake mechanism for a pair of laterally spaced wheels of a vehicle truck comprising a plurality of interleaved annular rotatable and non-rotatable friction braking elements movable from normal positions disengaged from each other to braking positions in frictional engagement with each other for braking said wheels, a plurality of like bars spaced from and extending parallel to the axis of said braking elements for supporting said non-rotatable braking elements and having portions of different cross-sectional areas stepped down in the direction of the ends of said bars, each of said non-rotatable braking elements being slidably mounted on a pair of like portions of said bars and being movable into engagement with shoulders formed at the junctions of said like portions and the adjacent portions of greater cross-sectional area for defining said normal position of the braking element, means for moving said non-rotatable braking elements to said normal positions, and means for moving said non-rotatable braking elements on said bars to said braking positions.

15. In a brake mechanism for a pair of laterally spaced wheels of a vehicle truck, a pair of bars disposed opposite each other at the opposite sides of and parallel to the axis of said wheels, a structure carrying said bars supported from said wheels and connected to said truck for holding said bars against rotation with said wheels, an annular brake cylinder device comprising two oppositely disposed complementary sections rigidly secured together in abutting relation and to said bars with said bars clamped in recesses formed in the abutting portions of said brake cylinder device, means associated with said bars for defining the position of said brake cylinder device thereon and for securing said brake cylinder device against movement longitudinally of said bars, an annular rotatable friction braking element secured to rotate with said wheels, an annular non-rotatable friction braking element slidably supported on said bars in concentric relation with said rotatable braking element and adapted to be moved on said bars by said brake cylinder device into frictional braking engagement with said rotatable braking element, and means operative to move said non-rotatable braking element out of frictional engagement with said rotatable braking element.

16. A brake mechanism for a pair of laterally disposed wheels of a vehicle truck comprising an annular brake cylinder device, a plurality of interleaved annular rotatable and nonrotatable friction braking elements disposed at either side of said brake cylinder device in concentric relation therewith and movable thereby to braking positions in frictional braking engagement to brake said wheels, means for moving said braking elements from said braking positions to normal positions disengaged from each other, a pair of like bars disposed opposite each other at opposite sides of the axis of said brake cylinder device and braking elements and each of said bars having an annular recess and at each side of said recess a plurality of cylindrical portions of different cross-sectional areas stepped down in diameter in the direction of the ends of said bars, said brake cylinder device comprising two complementary sections secured together at opposite ends to said bars within the recess in both of said bars, and each of said non-rotatable braking elements having a sliding fit at its opposite ends on a pair of like cylinder portions on said bars, and being movable thereon from said braking position into engagement with a shoulder formed on said bars at the junctions with the cylindrical portions of larger diameter for defining the normal position thereof.

17. A brake mechanism for a pair of laterally spaced wheels of a vehicle truck comprising a plurality of interleaved annular rotatable and non-rotatable friction braking elements movable from normal positions disengaged from each other to braking positions in frictional engagement with each other for braking said wheels, a pair of like bars disposed opposite each other at opposite sides of the axis of said braking elements and having a plurality of portions of different cross-sectional areas stepped down in size in the direction of one end of said bars, a plate slidably mounted on each of said plurality of portions of different cross-sectional areas on said bars, each of said non-rotatable braking elements being made in two like complementary sections secured at opposite ends in oppositely disposed abutting relation to an oppositely disposed pair of said plates, and being slidable with said plates to said normal and braking positions, shoulders being formed on said rods at the junctions of the portions of smaller cross-sectional area with the portions of larger cross-sectional area for limiting movement of said non-rotatable braking elements in the direction of releasing the brakes and for defining the release position of said non-rotatable braking elements.

18. In a brake mechanism for a pair of laterally disposed wheels of a vehicle truck, annular rotatable and non-rotatable friction braking elements adapted upon frictional engagement to brake said wheels, and means supporting said rotatable braking element for rotation with said wheels, said means comprising a rigid member connected at one end to one of said wheels, and a sleeve-like element encircling said member carrying said rotatable braking element, said sleeve-like element comprising two oppositely disposed complementary sections rigidly secured together in substantial abutting relation around and to said member, and a plurality of spaced elements extending through said sleeve-like element and into said rigid member for securing said element to rotate with said member.

19. In a brake mechanism for a pair of laterally disposed wheels of a vehicle truck, annular rotatable and non-rotatable friction braking elements adapted upon frictional engagement to brake said wheels, and means supporting said rotatable braking element for rotation with said wheels, said means comprising a rigid member connected at one end to one of said wheels, and a sleeve-like element encircling said member carrying said rotatable braking element, said sleeve-like element comprising two oppositely disposed complementary sections rigidly secured together in substantial abutting relation around and to said member, and a plurality of spaced set screws having screw-threaded connection with said sleeve-like element and a tight connection with said member securing said element to rotate with said member.

20. In a brake mechanism for a pair of laterally disposed wheels of a vehicle truck, annular rotatable and non-rotatable friction braking elements adapted upon frictional engagement to brake said wheels, and means supporting said rotatable braking element for rotation with said wheels, said means comprising a rigid member connected at one end to one of said wheels, and a sleeve-like element comprising two complementary sections removably secured in abutting relation around said member to rotate with said wheels, said rotatable brake element comprising two oppositely disposed complementary sections removably secured in substantial abutting relation to said sleeve-like element for rotation therewith.

21. In a brake mechanism for a pair of laterally disposed wheels of a vehicle truck, annular rotatable and non-rotatable friction braking elements adapted upon frictional engagement to brake said wheels, and means supporting said rotatable braking element for rotation with said wheels, said means comprising a rigid member connected at one end to one of said wheels, and a sleeve-like element encircling said member carrying said rotatable braking element, said sleeve-like element comprising two oppositely disposed complementary sections rigidly secured together in substantial abutting relation around and to said member for rotation with said wheels, said sleeve-like element being provided with a bearing portion outboard of the connection with said member, and a structure journaled on said bearing portion for supporting said non-rotatable braking element, said structure comprising two oppositely disposed complementary sections removably secured together in abutting relation on the bearing portion of said sleeve-like element.

22. In a brake mechanism for a pair of laterally spaced wheels of a vehicle truck, a brake actuator, annular rotatable and non-rotatable friction braking elements disposed at either side of said actuator, said non-rotatable braking elements being movable by said actuator in a direction away from said actuator to frictionally engage said rotatable braking elements for braking said wheels, a structure extending between and secured to said wheels, and having two spaced annular flanges, one of said rotatable braking elements being associated with each of said flanges, and a plurality of spaced rods extending between and secured at opposite ends to said flanges for supporting same against spreading apart upon movement of said non-rotatable braking elements against said rotatable braking elements.

23. In a brake mechanism for a pair of laterally spaced wheels of a vehicle truck, a brake actuator, annular rotatable and non-rotatable friction braking elements disposed at either side of said actuator, said non-rotatable braking elements being movable by said actuator in a direction away from said actuator to frictionally engage said rotatable braking elements for braking said wheels, two spaced members secured to rotate with said wheels, each of said members having an annular flange carrying one of said rotatable braking elements, and a plurality of spaced rods extending between and secured to said flanges for supporting said flanges against spreading apart upon movement of said non-rotatable elements against said rotatable braking elements.

24. In a brake mechanism for a pair of laterally spaced wheels of a vehicle truck, a brake actuator, annular rotatable and non-rotatable friction braking elements disposed at either side of said actuator, said non-rotatable braking elements being movable by said actuator in a direction away from said actuator to frictionally engage said rotatable braking elements for braking said wheels, two spaced members secured to rotate with said wheels, each of said members having a plurality of radial arms and an annular rim secured to the ends of said arms carrying one of said rotatable braking elements, and a plurality of spaced rods extending between and secured to the two rims for supporting same against spreading apart upon movement of said non-rotatable braking elements against said rotatable braking elements.

25. In a brake mechanism for a pair of laterally spaced wheels of a vehicle truck, a brake actuator, a plurality of interleaved annular rotatable and non-rotatable friction braking elements disposed at each side of said actuator, the outermost braking element at each side of said actuator being a rotatable element, the braking elements at the opposite sides of said actuator being movable thereby in opposite directions away from said actuator into frictional engagement and against said outermost elements for braking said wheels, a structure secured to rotate with said wheels and having two spaced annular flanges carrying said outermost rotatable braking elements, and a plurality of spaced rods carrying the other rotatable braking elements and secured at opposite ends to said flanges for supporting said flanges against spreading apart upon operation of said actuator.

26. In a brake mechanism for a pair of laterally spaced wheels of a vehicle truck, a brake actuator, annular rotatable and non-rotatable friction braking elements disposed at each side of said actuator, the braking elements at the two opposite sides of said actuator being movable thereby in opposite directions away from said actuator into frictional braking engagement for braking said wheels, a structure secured to rotate with said wheels and having two spaced annular flanges, an even number of rods equally spaced around the axis of rotation of said rotatable braking elements supporting said rotatable braking elements for rotation with said wheels, and means cooperating with said flanges and rods supporting said rods and adjustable to adjust said rods and thereby said rotatable brake elements with respect to said non-rotatable brake elements.

27. In a brake mechanism for a pair of laterally spaced wheels of a vehicle truck, a brake actuator, annular rotatable and non-rotatable friction braking elements disposed at each side of said actuator, the braking elements at the two opposite sides of said actuator being movable thereby in opposite directions away from said actuator into frictional braking engagement for braking said wheels, a structure secured to rotate with said wheels and having two spaced annular flanges, and an even number of rods equally spaced around the axis of rotation of said rotatable braking elements and removably secured at opposite ends to said two flanges, each of said rotatable braking elements being made in oppositely disposed complementary sections one of which is slidably mounted on the said rods at one side of said axis and the other section of which is slidably mounted on the other rod, the sections of said rotatable braking elements being removable with said rods upon disconnecting said rods from said flanges.

28. In a brake mechanism for a pair of laterally disposed wheels of a vehicle truck, a brake actuator, annular, interleaved rotatable and non-rotatable friction braking elements disposed at either side of said actuator and movable by said actuator in opposite directions away from said actuator into frictional interengagement for braking said wheels, a structure secured to rotate with said wheels, and a plurality of rods spaced around and parallel to the axis of rotation of said rotatable braking elements and removably secured at opposite ends to said structure for rotation with said wheels, each of said rotatable braking elements being made in two complementary sections, each section of which is slidably mounted on the said rods at one side of said axis of rotation and being removable with such rods from said structure.

29. In a brake mechanism for a pair of laterally disposed wheels of a vehicle truck, a brake actuator, annular interleaved rotatable and non-rotatable friction braking elements disposed at either side of said actuator and movable by said actuator in opposite directions away from said actuator into frictional interengagement for braking said wheels, a structure secured to rotate with said wheels, and a plurality of rods spaced around and parallel to the axis of rotation of said rotatable braking elements and removably secured at opposite ends to said structure for rotation with said wheels, each of said rotatable braking elements being made in two complementary sections, each section of which is slidably mounted on the said rods at one side of said axis of rotation and being removable with such rods from said structure, and means securing the adjacent ends of said sections in operating alignment.

30. In a brake mechanism for a pair of laterally spaced wheels of a vehicle truck, two sets of annular rotatable and non-rotatable friction braking elements, actuator means interposed between said two sets of elements and operative in opposite outwardly directions on said sets for forcing the braking elements in said sets into frictional braking engagement for braking said wheels, a structure secured to rotate with said wheels and having two annular flanges disposed one at the outer side of each of said sets for supporting the outside end braking element of said sets upon operation of said actuator means, a plurality of rods extending parallel to and disposed in spaced relation around the axis of rotation of said flanges, said rotatable braking elements being slidably mounted on said rods, said flanges having openings corresponding in number and disposition, and in alignment with the ends of said rods, and a member fitted in each of said openings and bearing against the outside surface of the flange and having screw-threaded engagement with the adjacent end of one of said rods, said members being adapted to transmit braking force from said rotatable braking elements to said flanges and to hold said flanges against spreading apart.

31. In a brake mechanism for a pair of laterally spaced wheels of a vehicle truck, two sets of annular rotatable and non-rotatable friction braking elements, actuator means interposed between said two sets of elements and operative in opposite outwardly directions on said sets for forcing the braking elements in said sets into friction braking engagement for braking said wheels, a structure secured to rotate with said wheels and having two annular flanges disposed one at the outer side of each of said sets for supporting the outside end braking element of said sets upon operation of said actuator means, a plurality of rods extending parallel to and disposed in spaced relation around the axis of rotation of said flanges, said rotatable braking elements being slidably mounted on said rods, said flanges having openings corresponding in number and disposition, and in alignment with the ends of said rods, and a member fitted in each of said openings and bearing against the outside surface of the flange and having screw-threaded engagement with the adjacent end of one of said rods, said members being adapted to transmit braking force from said rotatable braking elements to said flanges and to hold said flanges against spreading apart, the threads on both ends of said rods being formed in the same direction to permit longitudinal adjustment of said rods upon turning thereof relative to said members.

32. In a brake mechanism for a pair of laterally spaced wheels of a vehicle truck, two sets of annular rotatable and non-rotatable friction braking elements, actuator means interposed between said two sets of elements and operative in opposite outwardly directions on said sets for forcing the braking elements in said sets into frictional braking engagement for braking said wheels, a structure secured to rotate with said wheels and having two annular flanges disposed one at the outer side of each of said sets for supporting the outside end braking elements of said sets upon operation of said actuator means, a plurality of rods extending parallel to and disposed in spaced relation around the axis of rotation of said flanges, said rotatable braking elements being slidably mounted on said rods, said flanges having openings corresponding in number and disposition, and in alignment with the ends of said rods, and a member having screw-threaded connection with each end of each of said rods, the two members on the two ends of each rod fitting in an oppositely disposed pair of said openings in said flanges with one of the members having a sliding fit in the opening in one flange and the opposite member having a screw-threaded connection with the other flange in the opening therein, and both of said members bearing against the outer face of the respective flanges.

33. In a brake mechanism for a pair of laterally spaced wheels of a vehicle truck, two sets of annular rotatable and non-rotatable friction braking elements, actuator means interposed between said two sets of elements and operative in opposite outwardly directions on said sets for forcing the braking elements in said sets into frictional braking engagement for braking said wheels, a structure secured to rotate with said wheels and having two annular flanges disposed one at the outer side of each of said sets for supporting the outside end braking elements of said sets upon operation of said actuator means, a plurality of rods extending parallel to and disposed in spaced relation around the axis of rotation of said flanges, said rotatable braking elements being slidably mounted on said rods, said flanges having openings corresponding in number and disposition, and in alignment with the ends of said rods, and a member having screw-threaded connection with each end of each of said rods, the two members on the two ends of each rod having screw-threaded connection with the two flanges in an oppositely disposed pair of openings therein and each of said members having an annular collar bearing against the outer face of the respective flange, the internal and external screw-threads on each of said members being formed in the same direction and having the same pitch, and the screw-threads on both ends of said rods being formed in the same direction.

34. In a brake mechanism for a pair of laterally spaced wheels of a vehicle truck, two sets of annular rotatable and non-rotatable friction braking elements, actuator means interposed between said two sets of elements and operative in opposite outwardly directions on said sets for forcing the braking elements in said sets into frictional braking engagement for braking said wheels, a structure secured to rotate with said wheels and having two annular flanges one disposed at the outside of each of said sets of braking elements, a plurality of rods extending parallel to and spaced around the axis of said structure with one end of each of said rods extending into an opening in one of said flanges and the opposite end of each of said rods extending into an oppositely disposed opening in the other flange, a member fitted in each of said openings having a supporting connection with the adjacent ends of said rods, said rotatable braking elements being slidably mounted on oppositely disposed like portions of said rods of larger diameter than the ends of said rods but of smaller diameter than said openings, each of said rotatable braking elements comprising two oppositely disposed complementary sections one of which is carried by said rods at one side of the axis of rotation of said flanges and the other of which is carried by the other of said rods, the portions of said rods carrying said rotatable brake element being sufficiently smaller than said openings, and said rods being of such length that with said members removed from said flanges, the assemblies of said rods and sections of rotatable braking elements are capable of being shifted axially a sufficient distance for one end of said rods to clear the inner surface of the adjacent flange and permit said one end of said bars to then be moved radially to clear the periphery of said adjacent flange.

35. In a brake mechanism for a pair of laterally spaced wheels of a vehicle truck, a structure secured to rotate with said wheels, a plurality of rods spaced around and extending parallel to the axis of rotation of said structure and disposed with the opposite ends in oppositely disposed openings in said structure, each of said rods being alike and provided with a central portion and at each side of said central portion with a plurality of bearing portions of different cross-sectional areas stepped down in the direction of the ends of the rods, said openings being of larger diameter than the end portions of said rods, securing members secured in said openings and to the ends of said rods providing a driving connection between said rods and structure, an annular, rotatable friction braking element slidably mounted on each group of oppositely disposed like bearing portions of said rods at both sides of the central portions of the rods, a spring on each rod interposed between each securing member and the adjacent end rotatable braking element for moving same into engagement with the adjacent portions of said rods of greater cross-sectional area, and another spring on each rod interposed between each end rotatable braking element and the next adjacent rotatable braking element for shifting the last named braking element into engagement with the portions of said rods of next greater diameter.

36. An annular, ring-like brake cylinder device for controlling the braking operation of annular rotatable and non-rotatable friction braking elements of a disk brake mechanism comprising a plurality of relatively small, spaced brake cylinders arranged around and with their axes parallel to the axis of said device and connected in spaced relation by an annular flange, metal tubing cast within and encircling said flange forming an endless fluid conducting passage through said flange, said tubing having a plurality of fluid pressure conducting openings in one side, one of said openings being open to each of said brake cylinders.

37. An annular, ring-like brake cylinder device for controlling the braking operation of annular rotatable and non-rotatable friction braking elements of a disk brake mechanism comprising a plurality of relatively small, spaced brake cylinders arranged around the axis of said device and connected in spaced relation by an annular flange, each of said brake cylinders having a piston bore formed with its axis parallel to the axis of said device, and metal tubing cast within and encircling said flange forming an endless fluid conducting passage through said flange, said tubing having a plurality of side openings, one of said openings being open to each of said bores and formed at the same radius and from the same center as the respective bore.

38. A brake cylinder device for controlling the braking operation of annular rotatable and non-rotatable friction braking elements of a disk brake mechanism comprising two, like, semi-circular sections secured together in oppositely disposed abutting relation in the form of an annulus, each of said sections comprising a plurality of spaced relatively small brake cylinders arranged around one side of and with their axes parallel to the axis of said device and secured in spaced relation by a semi-circular flange, a pipe cast within said flange and extending from one end to the opposite end and having side openings, one side opening open to each of the brake cylinders in the section, and ring-like gasket means clamped between the abutting ends of said sections and around the adjacent ends of the pipes in the two flanges for preventing leakage of fluid under pressure from said pipes.

39. A brake cylinder device for controlling the operation of a disk brake mechanism comprising a casing having a piston bore, two oppositely working pistons in said bore having a pressure chamber between the pistons in which the pressure of fluid is adapted to be varied for controlling movement of said pistons away from and toward each other, a rigid open ended tube extending between and into a bore in each of said pistons and having a pressed fit in the bore in one of said pistons and a sliding fit in the bore in the other piston for holding said pistons in right-angular relation to the axis of said piston bore, and a breather hole in said tube connecting the interior thereof to said pressure chamber for maintaining the pressures within said tube equalized with that in said pressure chamber.

40. In a brake mechanism for a pair of laterally spaced wheels of a vehicle truck, a structure extending between and secured to rotate with said wheels, annular rotatable friction braking elements secured to said structure for rotation with said wheels, annular non-rotatable friction braking elements interleaved with and adapted to frictionally engage said rotatable elements for braking said wheels, a second structure journaled on the first named structure supporting said non-rotatable elements, a brake drum secured to said wheels for rotation therewith, friction braking means disposed to frictionally engage said brake drum for braking said wheels, and means anchoring said friction braking means to said second structure.

41. In a brake mechanism for a pair of laterally spaced wheels of a vehicle truck, a rigid member extending between and secured to said wheels for rotation therewith, a pair of sleeve-like elements secured in oppositely disposed, spaced relation to said rigid member, annular, rotatable friction braking elements secured to said sleeve-like elements for rotation with said wheels, annular, non-rotatable friction braking elements interleaved with and adapted to frictionally engage said rotatable elements for braking said wheels, a structure supporting said non-rotatable elements comprising two spaced end supports journaled on said two sleeve-like elements, a brake drum secured to one of said sleeve-like elements for rotation with said wheels, friction braking means disposed to frictionally engage said drum for braking said wheels, and anchor means carried by one of said end supports connected to said friction braking means for holding same against rotation with said drum.

42. In a brake mechanism for a pair of laterally spaced wheels of a vehicle truck, a rigid member extending between and secured to said wheels for rotation therewith, a pair of sleeve-like elements secured in oppositely disposed, spaced relation to said rigid member, each of said sleeve-like elements having an annular flange and outside of said flange an annular bearing portion, annular rotatable friction braking elements interposed between and carried by the flanges of said two sleeve-like elements for rotation with said wheels, annular non-rotatable friction braking elements interleaved with and adapted to frictionally engage said rotatable elements for braking said wheels, a structure supporting said non-rotatable elements comprising two spaced end supports journaled on the bearing portions of said two-sleeve-like elements, each of said end supports comprising two complementary sections arranged in oppositely disposed abutting relation, end plates secured to both sections of said end supports for holding said sections in operative relation, a brake drum removably secured to one of said sleeve-like elements outside of the bearing portion thereof and rotatable with said wheels and comprising two complementary, oppositely disposed sections secured in abutting cooperative relation, friction braking means disposed to frictionally engage said drum for braking said wheels, and anchor means associated with one of said end plates and connected to said friction braking means for anchoring same against rotation with said drum.

43. In a brake mechanism for a pair of laterally spaced wheels of a vehicle truck, a rigid member extending between and secured to said wheels for rotation therewith, a pair of sleeve-like elements secured in oppositely disposed, spaced relation to said rigid member, each of said sleeve-like elements having an annular flange and outside of said flange an annular bearing portion, annular rotatable friction braking elements interposed between and carried by the flanges of said two sleeve-like elements for rotation with said wheels, annular non-rotatable friction braking elements interleaved with and adapted to frictionally engage said rotatable elements for braking said wheels, a structure supporting said non-rotatable elements comprising two spaced end supports journaled on the bearing portions of said two sleeve-like elements, each of said end supports comprising two complementary sections arranged in oppositely disposed abutting relation, end plates secured to both sections of said end supports for holding said sections in operative relation, a brake drum removably secured to one of said sleeve-like elements outside of the bearing portion thereof and rotatable with said wheels and comprising two complementary, oppositely disposed sections secured in abutting cooperative relation, a pair of oppositely disposed substantially semi-circular brake bands arranged at opposite sides of said brake drum for frictionally engaging same to brake said wheels, anchor means associated with one of said end plates and connected to two adjacent ends of said brake bands for holding same against rotation with said drum, and hand operative mechanism connected to the opposite ends of said bands operative to contract said bands into frictional braking engagement with said drum.

44. In a disc brake mechanism for a pair of laterally spaced wheels of a vehicle truck, annular rotatable and non-rotatable friction braking elements disposed in concentric relation and movable into frictional engagement for braking said wheels, said rotatable braking element having a plurality of radial slots open to the braking face thereof, and said non-rotatable element having a plurality of slots open to the braking face thereof and disposed at an angle to the radius of the element.

45. In a disc brake mechanism for a pair of laterally spaced wheels of a vehicle truck, annular rotatable and non-rotatable friction braking elements disposed in concentric relation and movable into frictional engagement for braking said wheels, said rotatable braking element having a plurality of radial slots open to the braking face thereof, and said non-rotatable element comprising a backing plate, and a plurality of spaced friction braking elements secured to one side of said plate for frictionally engaging said rotatable element, the adjacent ends of said friction braking elements being formed at an angle to a line extending through the axis of said non-rotatable element.

46. In a disc brake mechanism for a pair of laterally spaced wheels of a vehicle truck, a rigid member extending between and secured to said wheels for rotation therewith, an annular rotatable friction braking element encircling and secured to said rigid member for rotation therewith and having a relatively hard friction braking portion, an annular, non-rotatable friction braking element encircling said rigid member and having a relatively soft braking portion arranged in cooperative relation with and adapted to frictionally engage the braking portion of said rotatable element to brake said wheels, said non-rotatable element comprising a plurality of sections arranged in end to end relation in the form of an annulus, removable securing means for securing said sections in said relation, each of said sections being removable from around said rigid member upon removal of said securing means.

47. In a disc brake mechanism for a pair of laterally spaced wheels of a vehicle truck, a rigid member extending between and secured to said wheels for rotation therewith, an annular rotatable friction braking element encircling and secured to said rigid member for rotation therewith and having a relatively soft friction braking portion, an annular, non-rotatable friction braking element encircling said rigid member and having a relatively hard braking surface arranged in cooperative relation with and adapted to frictionally engage the braking portion of said rotatable element to brake said wheels, said rotatable braking element comprising a plurality of sections arranged in end to end relation in the form of an annulus, removable attaching means for securing said sections in said relation, each of said sections being removable from around said rigid member upon removal of said attaching means.

48. A brake mechanism for a vehicle wheel comprising an annular, rotatable friction braking element secured to rotate with said wheel, an annular non-rotatable friction braking element having a normal position disengaged from said rotatable element and movable therefrom into frictional engagement with said rotable element for braking said wheel, and an annular brake cylinder device arranged in concentric relation with said non-rotatable element and having a plurality of radially arranged, spaced brake cylinders each having a piston bore parallel to the axis of said non-rotatable element, a piston in each of said bores, a rod projecting from each of said pistons and engaging said non-rotatable element and operative by said pistons to move said non-rotable element from said normal position into braking engagement with said rotatable element, said non-rotatable element comprising a ductile metal backing plate provided with a plurality of through openings, and a cast metal brake shoe disposed on the rotatable braking element side of said plate and having integral portions extending through said openings and a predetermined distance past the opposite side of said plate securing said shoe to said plate, said integral portions being arranged out of alignment with said piston rods, and certain of said integral portions being arranged to engage the end of said brake cylinder device around said piston bores for defining said normal position of said non-rotatable element.

49. In a brake mechanism for a wheel and axle assembly of a railway vehicle truck, in combination, a plurality of annular rotatable friction braking elements, a support structure for said elements secured to said wheels for rotating said elements with said wheels, a plurality of annular non-rotatable friction braking elements interleaved with said rotatable elements, a support structure for said non-rotatable elements carried by said wheels, means for moving said rotatable and non-rotatable elements into frictional braking interengagement, springs on each of said structures acting on the elements on the structures, said springs being operative to move all of said elements out of engagement with each other and into spaced relation, and stops on each of said structures engageable by the respective braking elements for defining the relative spaced positions of said elements.

50. In a brake mechanism for a wheel and axle assembly of a railway vehicle truck, in combination, a plurality of interleaved rotatable and non-rotatable annular friction braking elements having release positions disengaged from each other and adapted to be moved into frictional interengagement for braking said assembly, a support structure for said rotatable elements secured to said wheels for rotating said rotatable elements with said wheels, a second support structure carried by said wheels and supporting at all times said non-rotatable elements, springs on each of said support structures acting on the respective elements for moving said respective elements to their release positions, and shoulders on each structure engageable by the respective elements for defining their release positions.

51. In a disc brake mechanism for a pair of laterally spaced wheels of a vehicle truck, a rigid member extending between and secured to said wheels for rotation therewith, an annular rotatable friction braking element encircling and secured to said rigid member for rotation therewith, an annular, non-rotatable friction braking element encircling said rigid member and having a braking portion arranged in cooperative relation with and adapted to frictionally engage the braking portion of said rotatable element to brake said wheels, said non-rotatable element comprising a plurality of sections arranged in end to end relation in the form of an annulus, removable securing means for securing said sections in said relation, each of said sections being removable from around said rigid member upon removal of said securing means.

52. In a disc brake mechanism for a pair of laterally spaced wheels of a vehicle truck, a rigid member extending between and secured to said wheels for rotation therewith, an annular rotatable friction braking element encircling and secured to said rigid member for rotation therewith, an annular, non-rotatable friction braking element encircling said rigid member and having a braking surface arranged in cooperative relation with and adapted to frictionally engage the braking portion of said rotatable element to brake said wheels, said rotatable braking element comprising a plurality of sections arranged in end to end relation in the form of an annulus, removable attaching means for securing said sections in said relation, each of said sections being removable from around said rigid member upon removal of said attaching means.

53. In a brake mechanism for a railway vehicle truck comprising a truck frame, in combination, a truck frame supporting wheel and axle assembly comprising an axle, spaced wheels journaled on said axle, and a structure surrounding said axle and connecting said wheels in spaced relation, rotatable brake elements directly secured to said structure for rotation therewith, non-rotatable brake elements adapted to interengage with said rotatable brake elements to produce a braking effect, a supporting structure supported by the wheels for supporting said non-rotatable brake elements, restraining means cooperating with the truck frame for holding the non-rotatable brake elements against rotative movement, fluid pressure operated means carried by said second mentioned structure for effecting interengagement of said elements, and manually operative means for independently effecting braking action on the first mentioned structure and having a common support with said fluid pressure operated means.

54. A brake structure as defined in claim 53 further characterized by the manually operative means also having a common support with said non-rotatable brake elements.

JOSEPH C. McCUNE.